US010082602B2

United States Patent
Siddiqui et al.

(10) Patent No.: US 10,082,602 B2
(45) Date of Patent: Sep. 25, 2018

(54) EQUATION OF STATE BASED CORRELATION FOR GAS CONDENSATES AND WET GASES IN UNCONVENTIONAL SHALE PLAYS

(71) Applicant: Landmark Graphics Corporation, Houston, TX (US)

(72) Inventors: Shameem Siddiqui, Richmond, TX (US); Amit Kumar, Houston, TX (US); Ronald G Dusterhoff, Katy, TX (US)

(73) Assignee: LANDMARK GRAPHICS CORPORATION, Houston, TX (US)

(*) Notice: Subject to any disclaimer, the term of this patent is extended or adjusted under 35 U.S.C. 154(b) by 0 days.

(21) Appl. No.: 14/646,629

(22) PCT Filed: Apr. 22, 2014

(86) PCT No.: PCT/US2014/034996
§ 371 (c)(1),
(2) Date: May 21, 2015

(87) PCT Pub. No.: WO2015/163856
PCT Pub. Date: Oct. 29, 2015

(65) Prior Publication Data
US 2016/0259087 A1    Sep. 8, 2016

(51) Int. Cl.
*G01N 31/00*    (2006.01)
*G01V 99/00*    (2009.01)
*G06F 17/50*    (2006.01)
*E21B 49/08*    (2006.01)
*E21B 43/34*    (2006.01)

(52) U.S. Cl.
CPC ............ *G01V 99/005* (2013.01); *E21B 49/08* (2013.01); *G06F 17/50* (2013.01); *E21B 43/34* (2013.01)

(58) Field of Classification Search
USPC .................................................. 702/11, 12, 24
See application file for complete search history.

(56) References Cited

U.S. PATENT DOCUMENTS

| 2008/0234939 A1* | 9/2008 | Foot ..................... E21B 43/00 |
| | | 702/12 |
| 2009/0216463 A1* | 8/2009 | Xie ..................... G01N 21/314 |
| | | 702/24 |
| 2009/0248310 A1 | 10/2009 | Zuo |
| 2013/0151159 A1 | 6/2013 | Pomerantz et al. |

FOREIGN PATENT DOCUMENTS

WO    2011007268 A1    1/2011

OTHER PUBLICATIONS

Commissioner: International Search Report and the Written Opinion of the International Searching Authority; PCT/US14/34996: dated Jan. 9, 2015; 10 pgs.; ISA/KR.

(Continued)

*Primary Examiner* — Mohamed Charioui
(74) *Attorney, Agent, or Firm* — Polsinelli PC

(57) ABSTRACT

Systems and methods for correlating gas condensates and wet gases in unconventional shale plays based on an equation of state using a condensate gas-ratio, a separator pressure and a separator temperature.

9 Claims, 16 Drawing Sheets

(56) References Cited

OTHER PUBLICATIONS

Ikiensikimama, I.I. Azubuike and Ajienka, J.A.; Predictive Models for Condensate Gas Ratio (CGR)—Part 1: For Western Niger Delta Region; British Journal of Applied Science & Techology; 14 pgs.; Oct.-Dec. 2013; vol. 3, No. I.
Olaberinjo, et al.; KPIM of Gas/Condensate Productivity: Prediction of Condensate/Gas Ratio Using Reservoir Volumetric Balance; Journal of Applied Sciences; 2006; pp. 3068-3074; vol. 6, No. 15.
Coats, K.H. and Smart, G.T., Application of a Regression-Based EOS PVT Program to Laboratory Data, SPE Reservoir Engineering, May 1986, pp. 277-299.
Glaso, O.,Generalized Pressure-Volume-Temperature Correlations, Journal of Petroleum Technology, May 1980, pp. 785-795.
Whitson, C.H. and Torp, S.B., Evaluating Constant-Volume Depletion Data, Journal of Petroleum Technology, 1983, pp. 610-620, vol. 35 (3).
McCain, W.D., Heavy Components Control Reservoir Fluid Behavior; Journal of Petroleum Technology, Sep. 1994, pp. 746-750.
Petrosky, G.E. and Farshad, F., Pressure-Volume-Temperature Correlations for Gulf of Mexico Crude Oils, SPE 26644, presented at the 68th Annual Technical Conference and Exhibition, Houston. Texas, Oct. 3-6, 1993; pp. 395-406.
Standing, M.B.; A Pressure-Volume-Temperature Correction for Mixtures of California Oils and Gases, Drilling and Production Practices, API, 1947, pp. 275-287.
Al-Marhoun, Muhammad All; PVT Corrections for Middle East Crude Oils; Journal of Petroleum Technology; May 1998; pp. 650-666.
Vasquez, M. and Beggs, D., Correlations for Fluid Physical Properties Prediction, Journal of Petroleum Technology, Jun. 1980, pp. 968-970.
Walsh, M.P. and Towler, B.F., Method Computes PVT Properties for Gas Condensates, Oil & Gas Journal (Jul. 31, 1995), pp. 83-86.
Marshall B Standing and Donald I. Katz, Density of Natural Gases. Feb. 1941, pp. 140-149, American Institute of Mining and Metallurgical Engineers Incorporated—New York Meeting, United States.
Amit Kumar, Ron Dusterhoft,and Shameem Siddiqui, Completion and Production Strategies for Liquids-Rich Wells in Ultra-low-permeability Reservoirs, SPE Annual Technical Conference and Exhibition, Sep. 30, 2013, 26 pages, Society of Petroleum Engineers, New Orleans, Louisiana, United States.
Curtis Hays Whitson and Snjezana Sunjerga, PVT in Liquid-Rich Shale Reservoirs, SPE Annual Technical Conference and Exhibition, Oct. 8, 2012, 25 pages, Society of Petroleum Engineers, San Antonio, Texas, United States.
Abdus Satter, Ghulam M Iqbal, and James L. Buchwalter, Practical Enhanced Reservoir Engineering: Assisted with Simulation Software, 2008, pp. 440-442, PennWell Corporation, Tulsa Oklahoma, United States.
Alistair, Russell; Response to the First Examination Report dated Jun. 27, 2016: dated Aug. 22, 2016; 2 pages: British Patent Application No. GB 16 007 02.3; Hoffmann Eitle: London, United Kingdom.

\* cited by examiner

Relationship Between C7+ Mole Fraction vs. CGRA for Reservoir A.

Relationship Between C7+ Mole Fraction vs. CGRS for Reservoir A.

| GOR | 100,000 | 15,000 | 3,200 | 1,750 | | SCF/STB |
|-----|---------|--------|-------|-------|---|---------|
| CGR | 10.0 | 66.7 | 312.5 | 571.0 | | STB/MMSCF |
| | DRY GAS | WET GAS | RETROGRADE CONDENSATE | VOLATILE OIL | BLACK OIL | |

GOR/CGR RANGE COVERED

FIG. 11

EQUATION OF STATE BASED CORRELATION FOR GAS CONDENSATES AND WET GASES IN UNCONVENTIONAL SHALE PLAYS

This application claims the priority of PCT Patent Application No. PCT/US2014/34996, filed Apr. 22, 2014, which is incorporated herein by reference.

STATEMENT REGARDING FEDERALLY SPONSORED RESEARCH

Not applicable.

FIELD OF THE DISCLOSURE

The present disclosure generally relates to systems and methods for correlating gas condensates and wet gases in unconventional shale plays based on an equation of state. More particularly, the present disclosure relates to correlating gas condensates and wet gases in unconventional shale plays based on an equation of state using a condensate gas-ratio, a separator pressure and a separator temperature.

BACKGROUND

In the absence of pressure, volume and temperature ("PVT") data, it is almost impossible to generate the data files that are needed to conduct a reservoir engineering analysis and, in particular, a numerical reservoir simulation for modeling fluid behavior in hydrocarbon reservoirs. The typical PVT analysis involves collecting down-hole and/or surface samples, conducting quality control tests and then performing either one of a constant mass expansion (CME) or constant volume depletion (CVD) test to create extended black oil tables needed for the reservoir engineering analysis. Even the most popular oil correlations listed in table 1 below do not work reliably with gas condensates (also referred to as retrograde condensates) and wet gases because the extended black oil correlations are generally prone to errors and inconsistencies.

TABLE 1

Summary of popular correlations for oil properties showing input requirements and calculated properties

| Calculated property | Symbol for property | Name of Correlation | Pressure | Temperature | Oil_API | Gas_Gravity | Gas Solubility | Bubble point pressure |
|---|---|---|---|---|---|---|---|---|
| Gas solubility | Rs | Standing | ✓ | ✓ | ✓ | ✓ | | |
| Gas solubility | Rs | Vasquez-Beggs | ✓ | ✓ | ✓ | ✓ | | |
| Gas solubility | Rs | Glaso | ✓ | ✓ | ✓ | ✓ | | |
| Gas solubility | Rs | Marhoun | ✓ | ✓ | ✓ | ✓ | | |
| Gas solubility | Rs | Petrosky-Farshad | ✓ | ✓ | ✓ | ✓ | | |
| Bubble Point Pressure | Pb | Standing | | ✓ | ✓ | ✓ | ✓ | |
| Bubble Point Pressure | Pb | Vasquez-Beggs | | ✓ | ✓ | ✓ | ✓ | |
| Bubble Point Pressure | Pb | Glaso | | ✓ | ✓ | ✓ | ✓ | |
| Bubble Point Pressure | Pb | Marhoun | | ✓ | ✓ | ✓ | ✓ | |
| Bubble Point Pressure | Pb | Petrosky-Farshad | | ✓ | ✓ | ✓ | ✓ | |
| Oil Formation Volume Factor | Bo | Standing | | ✓ | ✓ | ✓ | ✓ | |
| Oil Formation Volume Factor | Bo | Vasquez-Beggs | | ✓ | ✓ | ✓ | ✓ | |
| Oil Formation Volume Factor | Bo | Glaso | | ✓ | ✓ | ✓ | ✓ | |
| Oil Formation Volume Factor | Bo | Marhoun | | ✓ | ✓ | ✓ | ✓ | |
| Oil Formation Volume Factor | Bo | Petrosky-Farshad | | ✓ | ✓ | ✓ | ✓ | |
| Oil Formation Volume Factor | Bo | Material Balance Equation | | ✓ | ✓ | ✓ | ✓ | |
| Isothermal Compressibility of Oil | co | Vasquez-Beggs | | ✓ | ✓ | ✓ | | |
| Isothermal Compressibility of Oil | co | Petrosky-Farshad | | ✓ | ✓ | ✓ | | |
| Isothermal Compressibility of Oil | co | McCain | | ✓ | ✓ | ✓ | | |
| Total Fluid Volume Factor | Bt | Standing | ✓ | ✓ | ✓ | ✓ | ✓ | |
| Total Fluid Volume Factor | Bt | Glaso | ✓ | ✓ | ✓ | ✓ | ✓ | |
| Total Fluid Volume Factor | Bt | Marhoun | ✓ | ✓ | ✓ | ✓ | ✓ | |
| Viscosity of Dead Oil | $\mu\_do$ | Beal | | ✓ | ✓ | | | |
| Viscosity of Dead Oil | $\mu\_do$ | Beggs-Robinson | | ✓ | ✓ | | | |
| Viscosity of Dead Oil | $\mu\_do$ | Glaso | | ✓ | ✓ | | | |
| Viscosity of Sat Oil | $\mu\_osat$ | Beggs-Robinson | | ✓ | ✓ | | ✓ | |
| Viscosity of Sat Oil | $\mu\_osat$ | Chew-Connally | | ✓ | ✓ | | ✓ | |
| Viscosity of Under Saturated Oil | $\mu\_uo$ | Vasquez - Beggs | | ✓ | ✓ | | ✓ | ✓ |

Therefore, the current trend is to use commercial PVT simulation software to first obtain a mathematically recombined composition, fit the data to an equation of state (EOS) model and create PVT data files for the numerical reservoir simulation in full compositional 7mode. Because this technique can be time consuming and expensive, it is common practice to create reduced compositional models by combining some of the components together and selecting the reduced compositional models that provide a good match with the full compositional models.

BRIEF DESCRIPTION OF THE DRAWINGS

The present disclosure is described below with references to the accompanying drawings in which like elements are referenced with like reference numerals, and in which:

FIG. 11 is a chart listing the gas-oil-ratio and condensate gas-ratio ranges.

DETAILED DESCRIPTION OF THE PREFERRED EMBODIMENTS

Figure 1A:
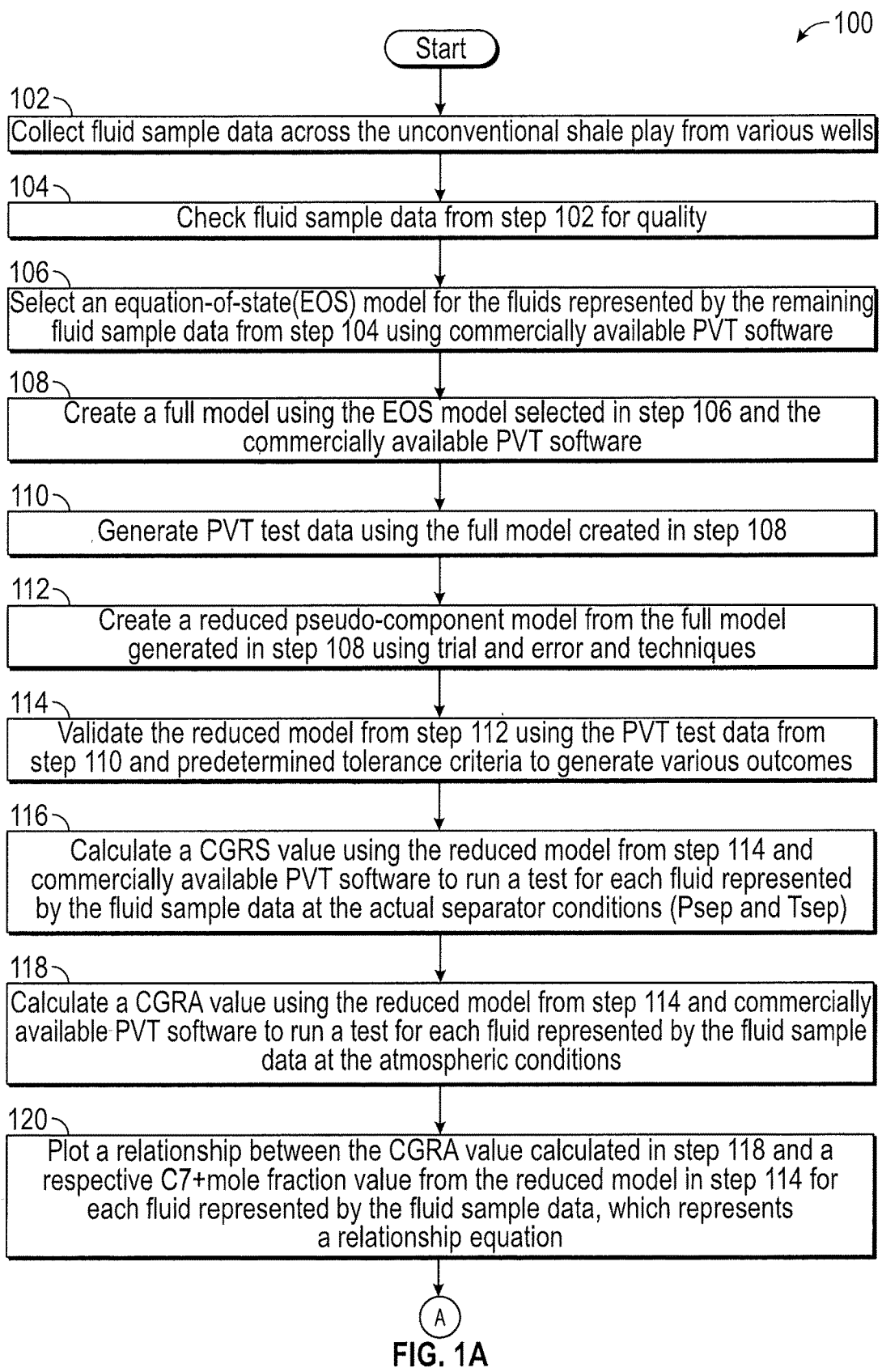
FIG. 1A is a flow diagram illustrating one embodiment of a method for implementing the present disclosure.

The present disclosure overcomes one or more deficiencies in the prior art by providing systems and methods for correlating gas condensates and wet gases in unconventional shale plays based on an equation of state using a condensate gas-ratio, a separator pressure and a separator temperature.

In one embodiment, the present disclosure includes a method for correlating gas condensates and wet gases in unconventional shale plays, which comprises: i) calculating a CGRS value using a reduced pseudo-component fluid model and data for each fluid at a reservoir temperature, a separator pressure and a separator temperature; ii) calculating a CGRA value using the reduced pseudo-component fluid model and data for each fluid at atmospheric conditions; iii) plotting a relationship between the CGRA value and a respective C7+ mole fraction value from the reduced pseudo-component fluid model for each fluid using a computer processor, the relationship representing a CGRA relationship equation; iv) plotting a relationship between the CGRS value and a respective C7+ mole fraction value from the reduced pseudo-component fluid model for each fluid using the computer processor, the relationship representing a CGRS relationship equation; v) creating a fluid database using a compositional simulation PVT data file for each fluid; vi) calculating a C7+ value using one of the CGRA value for each fluid and the CGRA relationship equation and the CGRS value for each fluid and the CGRS relationship equation, wherein C7+ represents the mole fraction of components heavier than heptane (C7); and vii) determining a mole fraction of each pseudo-component in the reduced pseudo-component fluid model using the C7+ value and the fluid database.

In another embodiment, the present disclosure includes a non-transitory program carrier device tangibly carrying computer executable instructions for correlating gas condensates and wet gases in unconventional shale plays, the instructions being executable to implement: i) calculating a CGRS value using a reduced pseudo-component fluid model and data for each fluid at a reservoir temperature, a separator pressure and a separator temperature; ii) calculating a CGRA value using the reduced pseudo-component fluid model and data for each fluid at atmospheric conditions; iii) plotting a relationship between the CGRA value and a respective C7+ mole fraction value from the reduced pseudo-component fluid model for each fluid, the relationship representing a CGRA relationship equation; iv) plotting a relationship between the CGRS value and a respective C7+ mole fraction value from the reduced pseudo-component fluid model for each fluid, the relationship representing a CGRS relationship equation; v) creating a fluid database using a compositional simulation PVT data file for each fluid; vi) calculating a C7+ value using one of the CGRA value for each fluid and the CGRA relationship equation and the CGRS value for each fluid and the CGRS relationship equation, wherein C7+ represents the mole fraction of components heavier than heptane (C7); and vii) determining a mole fraction of each pseudo-component in the reduced pseudo-component fluid model using the C7+ value and the fluid database.

In yet another embodiment, the present disclosure includes a method for correlating gas condensates and wet gases in unconventional shale plays, which comprises: i)

calculating a CGRS value using a reduced pseudo-component fluid model and data for each fluid at multiple data points for a reservoir temperature, a separator temperature and a separator pressure; ii) calculating a CGRA value using the reduced pseudo-component fluid model and data for each fluid at atmospheric conditions; iii) plotting a relationship between the CGRA value and a respective C7+ mole fraction value from the reduced pseudo-component fluid model for each fluid using a computer processor, the relationship representing a CGRA relationship equation; iv) plotting a relationship between the CGRS value and a new parameter X, which is a product of a predetermined scaling parameter W and the CGRA value for each separator pressure for each fluid using the computer processor, the relationship representing a CGRS relationship equation; v) creating a fluid database using a compositional simulation PVT data file for each fluid; vi) calculating a C7+ value using the CGRA relationship equation and one of a known CGRA value for each fluid and a calculated CGRA value for each fluid, wherein C7+ represents the mole fraction of components heavier than heptane (C7); and vii) determining a mole fraction of each pseudo-component in the reduced pseudo-component fluid model using the C7+ value and the fluid database.

In yet another embodiment, the present disclosure includes a non-transitory program carrier device tangibly carrying computer executable instructions for correlating gas condensates and wet gases in unconventional shale plays, the instructions being executable to implement: i) calculating a CGRS value using a reduced pseudo-component fluid model and data for each fluid at multiple data points for a reservoir temperature, a separator temperature and a separator pressure; ii) calculating a CGRA value using the reduced pseudo-component fluid model and data for each fluid at atmospheric conditions; iii) plotting a relationship between the CGRA value and a respective C7+ mole fraction value from the reduced pseudo-component fluid model for each fluid, the relationship representing a CGRA relationship equation; iv) plotting a relationship between the CGRS value and a new parameter X, which is a product of a predetermined scaling parameter W and the CGRA value for each separator pressure for each fluid, the relationship representing a CGRS relationship equation; v) creating a fluid database using a compositional simulation PVT data file for each fluid; vi) calculating a C7+ value using the CGRA relationship equation and one of a known CGRA value for each fluid and a calculated CGRA value for each fluid, wherein C7+ represents the mole fraction of components heavier than heptane (C7); and vii) determining a mole fraction of each pseudo-component in the reduced pseudo-component fluid model using the C7+ value and the fluid database.

The relationship between various quantities of interest, such as the CGRA value and the C7+ mole fraction value can be linear or non-linear. Based on available data, a straight line or polynomial fit can be reasonably made in some cases. However, more advanced methods can be applied to estimate a more complex functional form suggested by the data. Even a non-parametric method of function approximation, such as a neural network, can be applied to establish the relationship. Regardless of the method used to determine the relationship, it must ensure that 1) a fit can be made to the degree of quality appropriate for the task at hand; and 2) the fitted estimator can be evaluated for the input quantity in the desired range. If, for example, the relationship between the CGRA value and the C7+ mole fraction value has been fitted, then evaluation of the fitted estimator for a CGRA value in the desired range yields a mole fraction value for C7+. Various function approximation methods are thus, available and a particular type of function approximation method is not required.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Figure 1B:
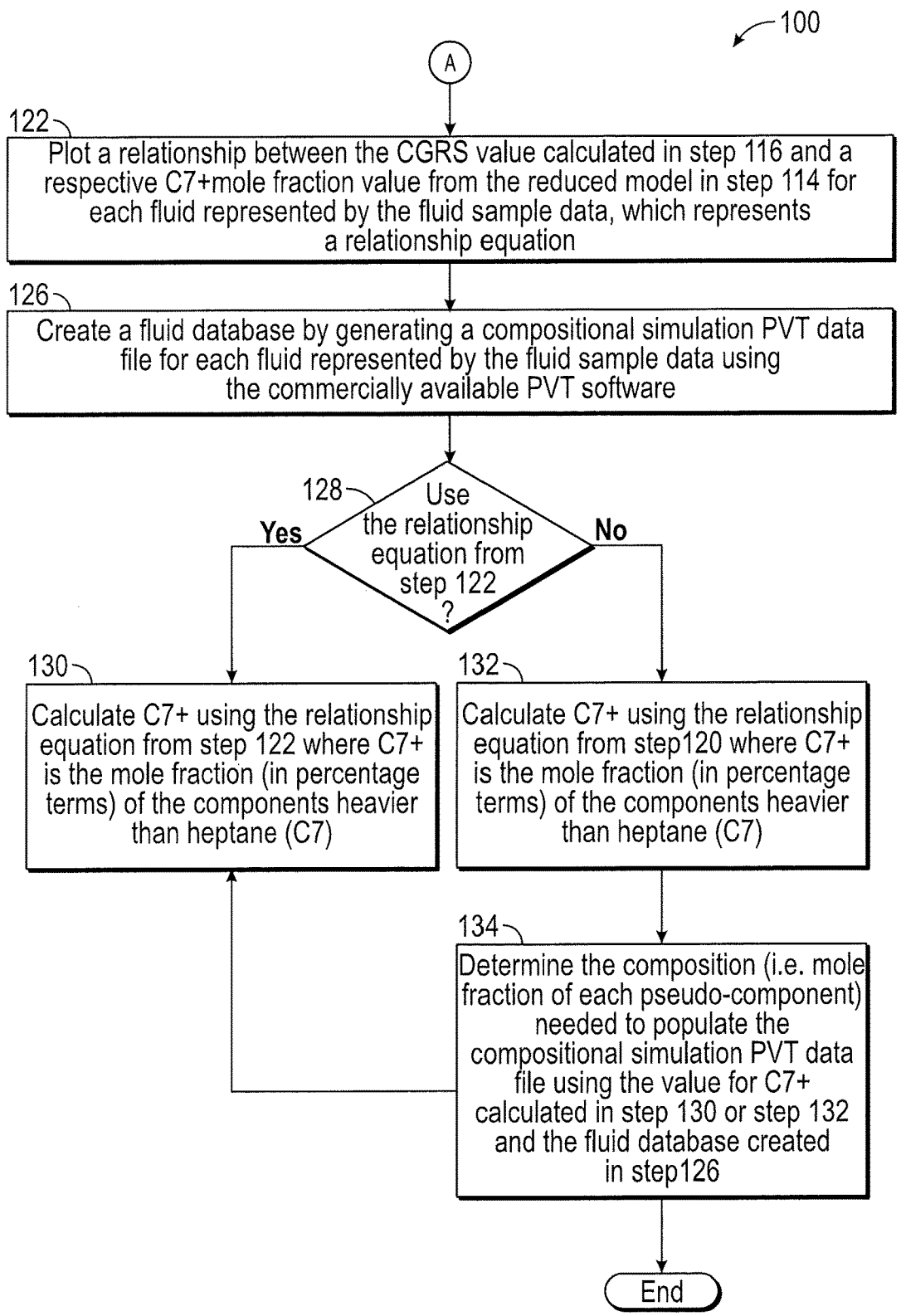
FIG. 1B is a flow diagram illustrating a continuation of the method illustrated in FIG. 1A.

Referring now to FIGS. 1A-1B, a flow diagram illustrates one embodiment of a method 100 for implementing the present disclosure. The method 100 may be applied to shallow unconventional reservoirs where the reservoir pressure is close to the saturation pressure, which only allows a narrow scope of available pressure and temperature settings to choose from for programming a separator. A separator is typically a pressure vessel used for separating different components of hydrocarbon fluids such as methane, ethane, propane, butane, etc. coming from the wells into liquid and gas fractions. For gas condensates and wet gases, the saturation pressure is the dew point pressure. The method 100 includes a development stage (FIG. 1A) to create a fluid database and an application stage (FIG. 1B) to select the correct data from the database. The method 100 may be applied to wet gases and gas condensates within the following gas-oil-ratio (GOR) and condensate gas-ratio (CGR) ranges noted in FIG. 11.

Figure 3:
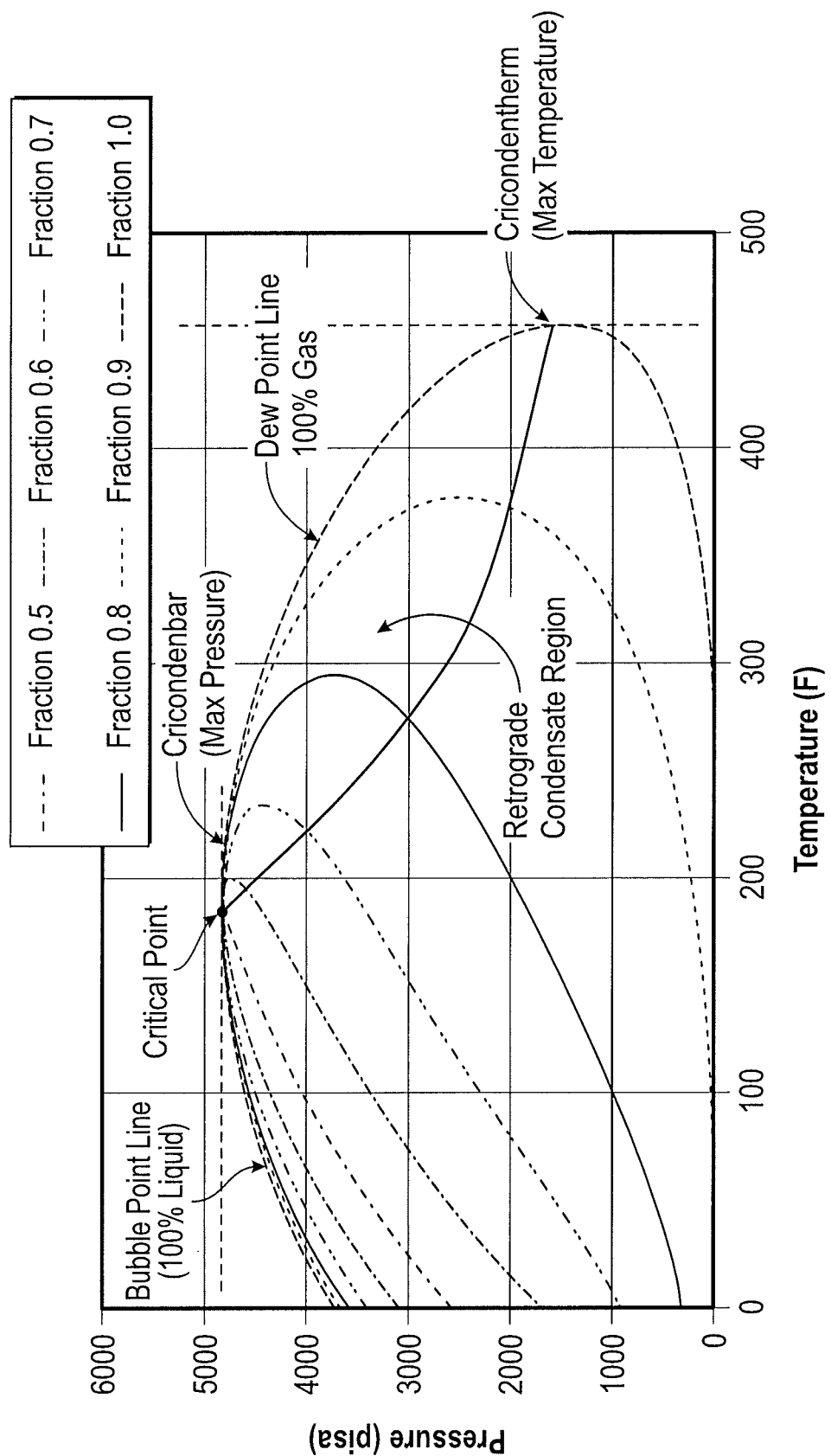
FIG. 3 is a P-T diagram illustrating an example of a phase envelope characteristic of a hydrocarbon fluid.

In step 102, fluid sample data is collected across the unconventional shale play from various wells (the more, the better) to cover a broad range of fluid types to be produced using techniques well known in the art. Each hydrocarbon fluid sample is represented by its own phase envelope and is collected either from the wellbore or at the surface (typically at the separators). A phase envelope is a plot that is characteristic of a hydrocarbon fluid, which is also referred to as a P-T (pressure temperature) diagram in petroleum engineering literature. An example of a P-T diagram is illustrated in FIG. 3. Where the bubble point and dew point lines converge is the critical point. Cricondenbar is the highest pressure on the phase envelope and cricondentherm is the highest temperature on the phase envelope. Typically, the initial reservoir conditions (i.e. pressure and temperature conditions) of the gas condensates and wet gases are on the right of the critical point. Reservoir temperatures typically stay constant throughout the life of a reservoir, but the pressure changes with time (and production) along a vertical line called an isotherm in the P-T diagram (not shown) that is parallel to the cricondentherm line as the reservoir is producing hydrocarbons. For example, a shale play containing gas condensate fluids may have an initial reservoir condition of 400 deg. F. and 6000 psi. As the reservoir starts to produce, it produces single phase gas until the reservoir reaches the dew point line at around 3300 psi. A typical separator condition can be 200 deg. F. and 1000 psi, which causes the fluid to traverse the dew point line and enter the two phase zone inside the phase envelope, allowing it to release some of the liquids in the separator. The fluid sample data includes the mole fractions of the recombined fluid sample. The component list can go up to C7+(heptane and heavier), C10+ and sometimes C30+. The fluid sample data may also include additional laboratory test data such as, constant composition expansion (CCE) data, which is also referred to as CME data, and CVD data.

In step 104, the fluid sample data from step 102 is checked for quality using techniques well known in the art and commercially available PVT software for quality control. The fluid sample data that fails to meet predetermined quality control standards may be discarded.

In step 106, an equation-of-state (EOS) model (e.g. the Peng-Robinson or Soave-Redlich-Kwong EOS model) is selected for the fluids represented by the remaining fluid sample data from step 104 using commercially available PVT software.

In step 108, a full model is created using the EOS model selected in step 106 and the commercially available PVT software. This step may involve some initial lumping of heavier components, which usually have smaller mole fractions for wet gases and gas condensates, while honoring available lab data.

In step 110, PVT test data are generated using the full model created in step 108 and commercially available PVT software. The PVT test data may include P-T diagram data, separator test data, CCE data and CVD data.

In step 112, a reduced pseudo-component model is created from the full model generated in step 108 using trial and error techniques and commercially available PVT software. This step is necessary to create a reduced model, which can be used in compositional simulation. The reduced model is a common pseudo-component model in which further lumping is done to reduce the total number of pseudo-components to less than about 10, which reduces the compositional simulation time. Phase behavior calculations and compositional simulations with an equation of state require the use of pseudo-components to represent the oil and gas mixtures. Because of the large number of components which form the heavy fractions (e.g. C6+ fractions), it is necessary to group them into pseudo-components. In other words, the more pseudo-components there are, the longer the simulation will take. Furthermore, to minimize simulation costs, it is also advantageous to lump the light fractions.

Figure 4A:
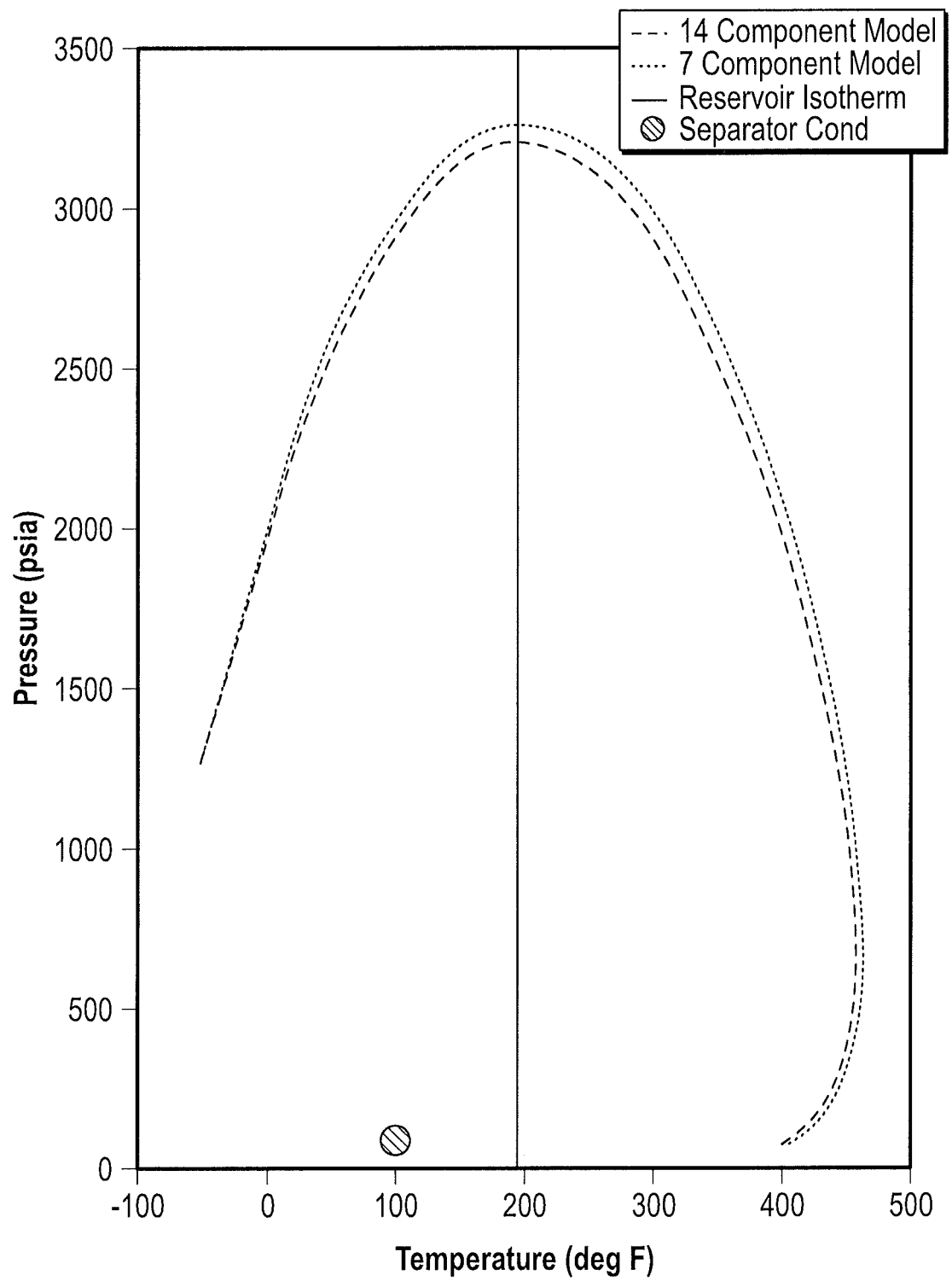
FIG. 4A is a P-T diagram illustrating an example of a match between a full 14 component fluid model and a 7-component reduced fluid model based on PVT test data from a well in an unconventional shale play.
Figure 4B:
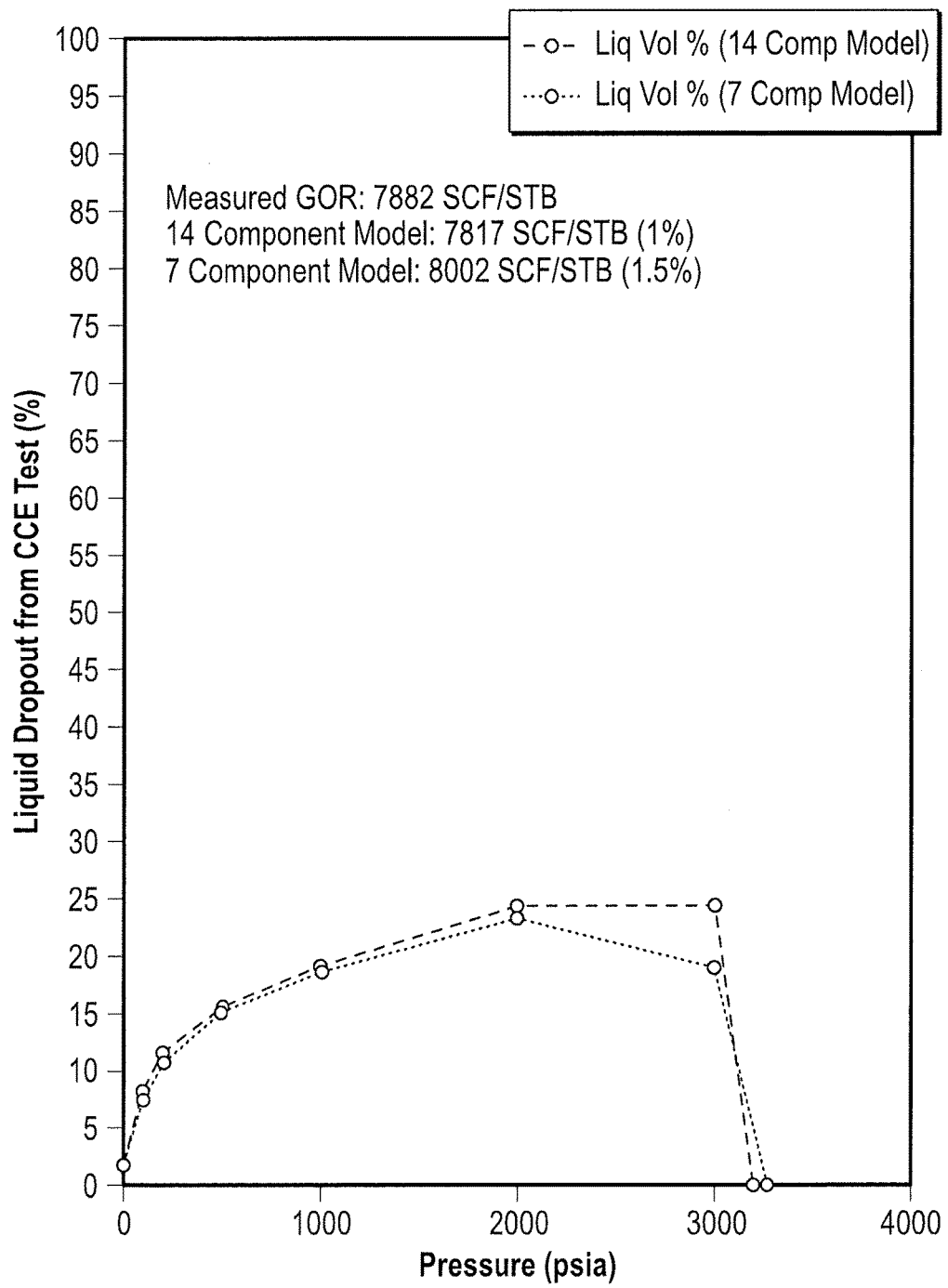
FIG. 4B is a liquid dropout graph illustrating an example of a match between the full 14 component fluid model and the 7-component reduced fluid model illustrated in FIG. 4A.
Figure 4C:
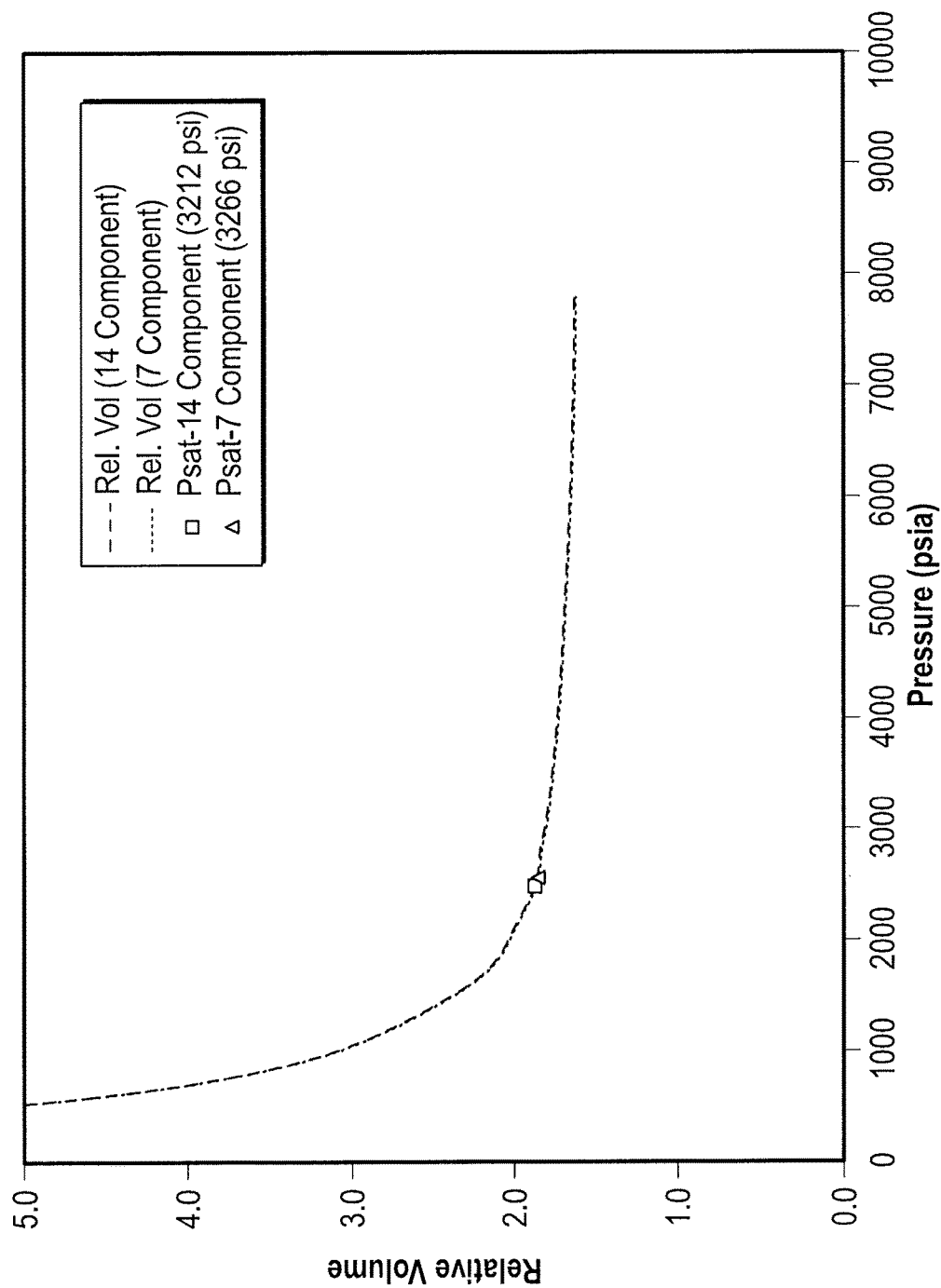
FIG. 4C is a relative volume graph illustrating an example of a match between the full 14 component fluid model and the 7-component reduced fluid model illustrated in FIG. 4A.

In step 114, the reduced model from step 112 is validated using the PVT test data from step 110 and predetermined tolerance criteria to generate various outcomes and commercially available PVT software. If the results of the various outcomes substantially match (i.e. fall within an acceptable margin of error), then the reduced model is validated. Otherwise, step 112 may be repeated to create another reduced model for validation. FIGS. 4A-4C illustrate an example of a match between the full 14 component model and the 7-component reduced model using a P-T diagram, a liquid dropout graph and a relative volume graph based on PVT test data from a well in an unconventional shale play.

In step 116, a CGR value, which is hereinafter referred to as the CGRS value, is calculated using the reduced model from step 114 and commercially available PVT software to run a test for each fluid represented by the fluid sample data at the actual separator conditions (Psep and Tsep).

In step 118, a CGR value, which is hereinafter referred to as the CGRA value, is calculated using the reduced model from step 114 and commercially available PVT software to run a test for each fluid represented by the fluid sample data at atmospheric conditions.

Figure 5A:
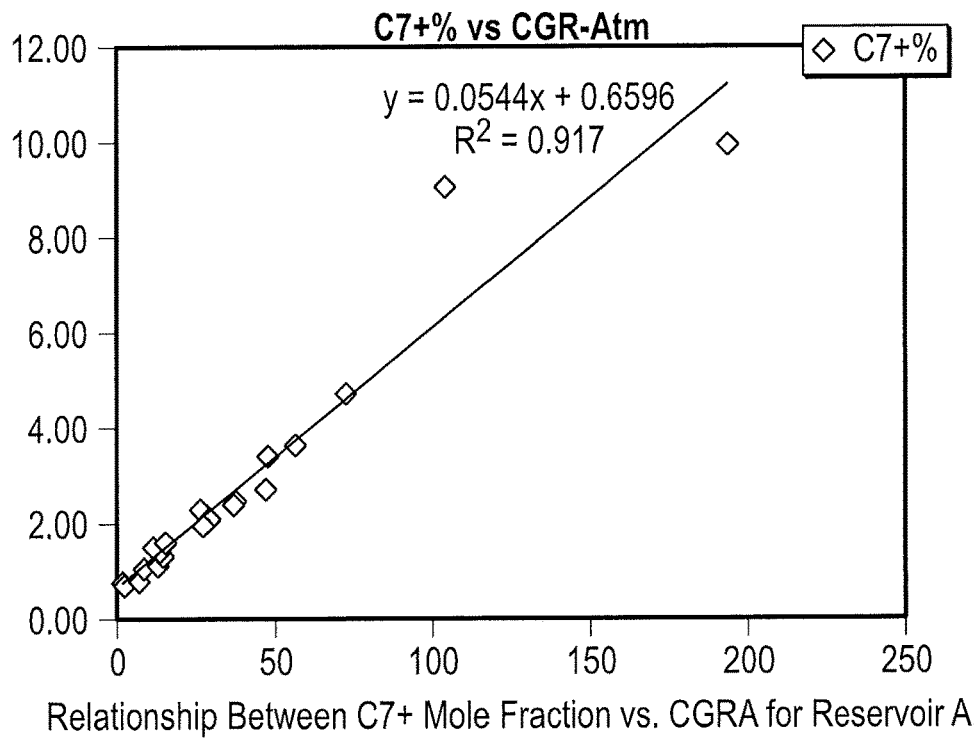
FIG. 5A is a graph illustrating the relationship between a CGRA value and a respective C7+ mole fraction value from a reduced model for an exemplary reservoir.
Figure 10:
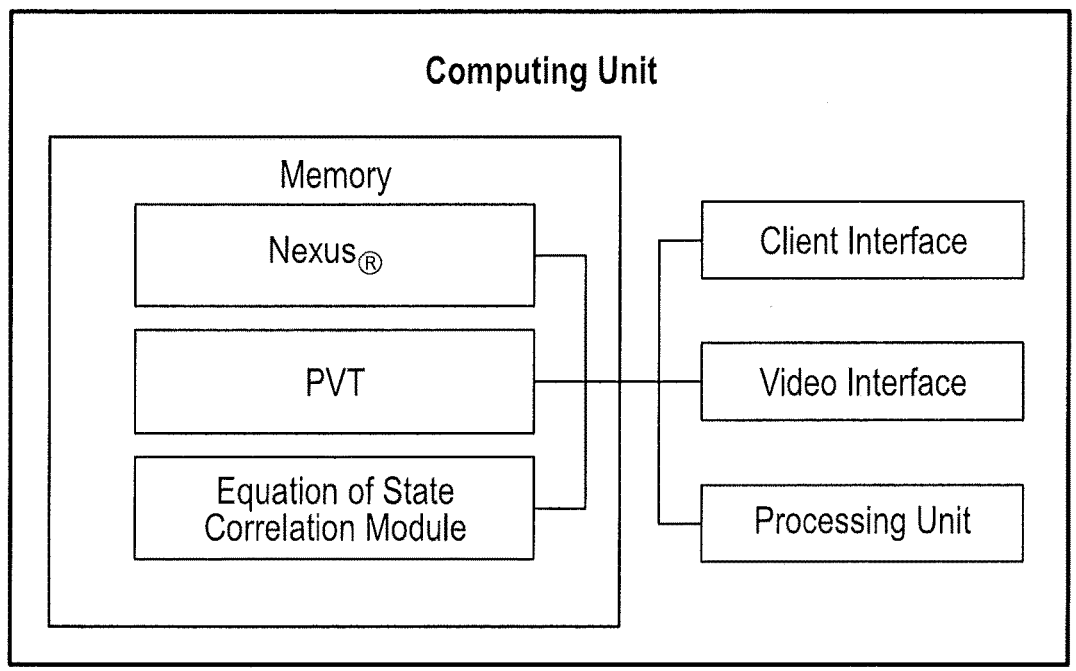
FIG. 10 is a block diagram illustrating one embodiment of a computer system for implementing the present disclosure.

In step 120, a relationship is plotted between the CGRA value calculated in step 118 and a respective C7+ mole fraction value from the reduced model in step 114 for each fluid represented by the fluid sample data by plotting the values using any technique well known in the art, such as the least squares method, and the client interface and/or the video interface described in reference to FIG. 10. The relationship is represented by an equation, which is preferably linear or quadratic, and may be validated by accepting a high coefficient of correlation ($R^2$) and, if necessary, eliminating obvious outliers from the relationship. FIG. 5A illustrates the relationship between a CGRA value and a respective C7+ mole fraction value from a reduced model for an exemplary reservoir except that outliers were not removed.

Figure 5B:
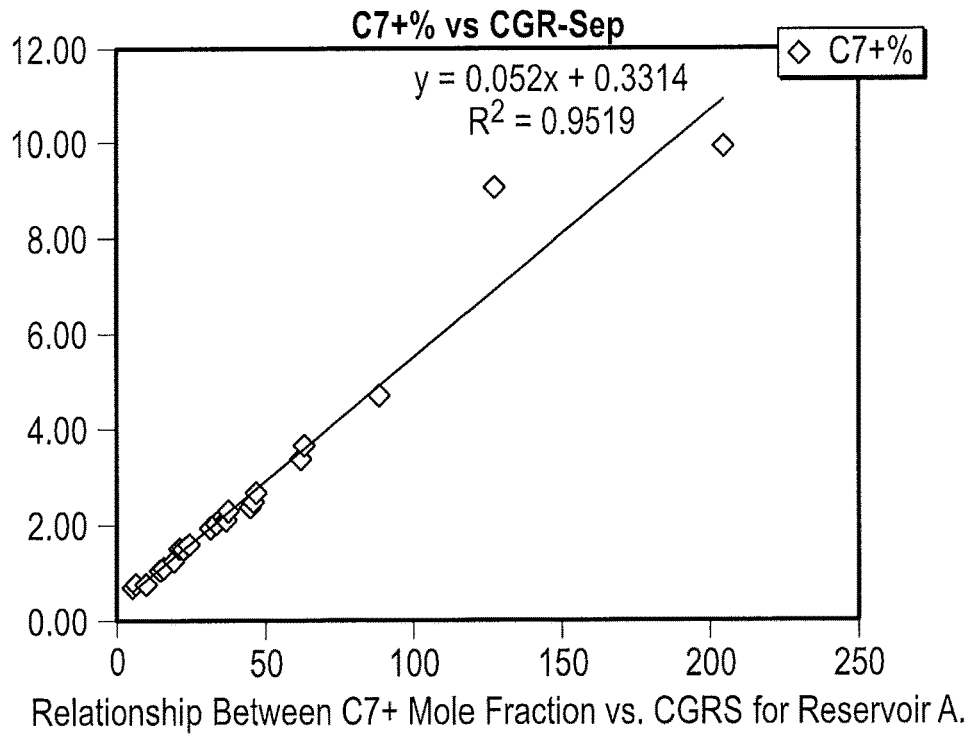
FIG. 5B is a graph illustrating the relationship between a CGRS value and a respective C7+ mole fraction value from a reduced model for the same reservoir used in FIG. 5A.

In step 122, a relationship is plotted between the CGRS value calculated in step 116 and a respective C7+ mole fraction value from the reduced model in step 114 for each fluid represented by the fluid sample data by plotting the values using any technique well known in the art, such as the least squares method, and the client interface and/or the video interface described in reference to FIG. 10. The relationship is represented by an equation, which is preferably linear or quadratic, and may be validated by accepting a high coefficient of correlation ($R^2$) and, if necessary, eliminating obvious outliers from the relationship. FIG. 5B illustrates the relationship between a CGRS value and a respective C7+ mole fraction value from a reduced model for the same reservoir used in FIG. 5A except that outliers were not removed.

In step 126, a fluid database is created by generating a compositional simulation PVT data file for each fluid represented by the fluid sample data using the commercially available PVT software that may also be used to run standard tests (e.g. separator test and CME, CVD tests) for producing additional data for the fluid database. Based on the number of fluid test reports received, the fluid database is maintained for each field, which contains but is not limited to PVT data tables in specific numerical simulator input format, the mole fractions of the pseudo-components, saturation pressure (dew point pressure), data on any separator test, and CME, CVD tests, for example. Preferably, a minimum of 5 fluid reports per field is recommended. An exemplary fluid database is illustrated in table 2 below, which includes the mole fraction of seven different pseudo-components (P1-P7), expressed as a percentage, and a C7+% value for each respective fluid.

In step 128, the method 100 determines whether to use the relationship equation from step 122 based on the use of a separator. If the relationship equation from step 122 is not used, then the method 100 proceeds to step 132. If the relationship equation from step 122 is used, then the method 100 proceeds to step 130.

In step 130, C7+ is calculated using the relationship equation from step 122 where C7+ is the mole fraction (in percentage terms) of the components heavier than heptane (C7). For the particular shale play used in FIG. 5B, the equation is C7+%=0.052*CGRS+0.3314, wherein CGRS is the CGRS value from step 116 for each fluid. For other shallow shale reservoirs like the one used for the exemplary equation above, the relationship equation will have the same form except that the coefficients may be slightly different.

In step 132, C7+ is calculated using the relationship equation from step 120 where C7+ is the mole fraction (in percentage terms) of the components heavier than heptane (C7). For the particular shale play used in FIG. 5A, the equation is C7+%=0.0544*CGRA+0.6596, wherein CGRA is the CGRA value from step 118 for each fluid. For other shallow shale reservoirs like the one used for the exemplary equation above, the relationship equation will have the same form except that the coefficients may be slightly different.

Figure 2A:
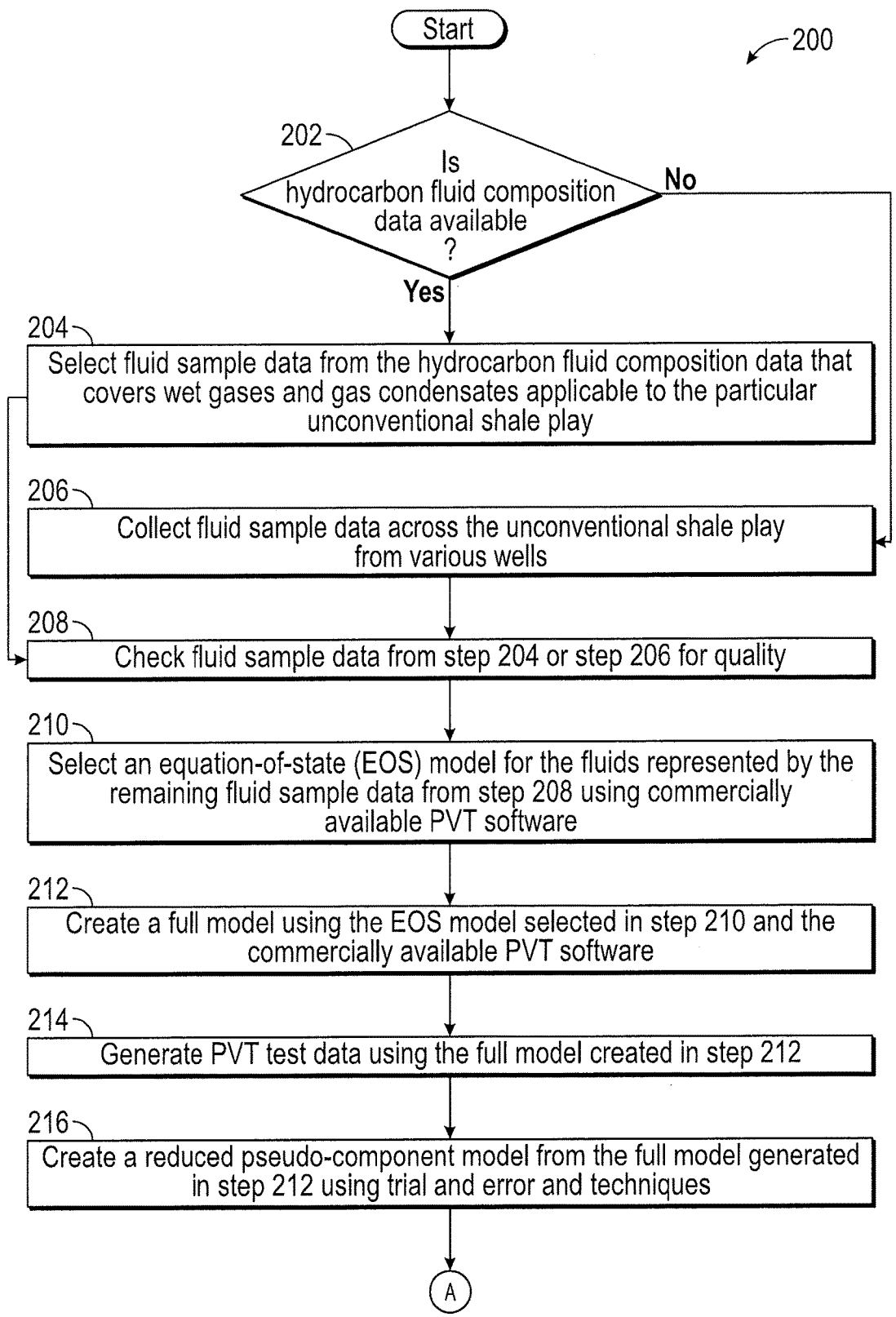
FIG. 2A is a flow diagram illustrating another embodiment of a method for implementing the present disclosure.
Figure 2B:
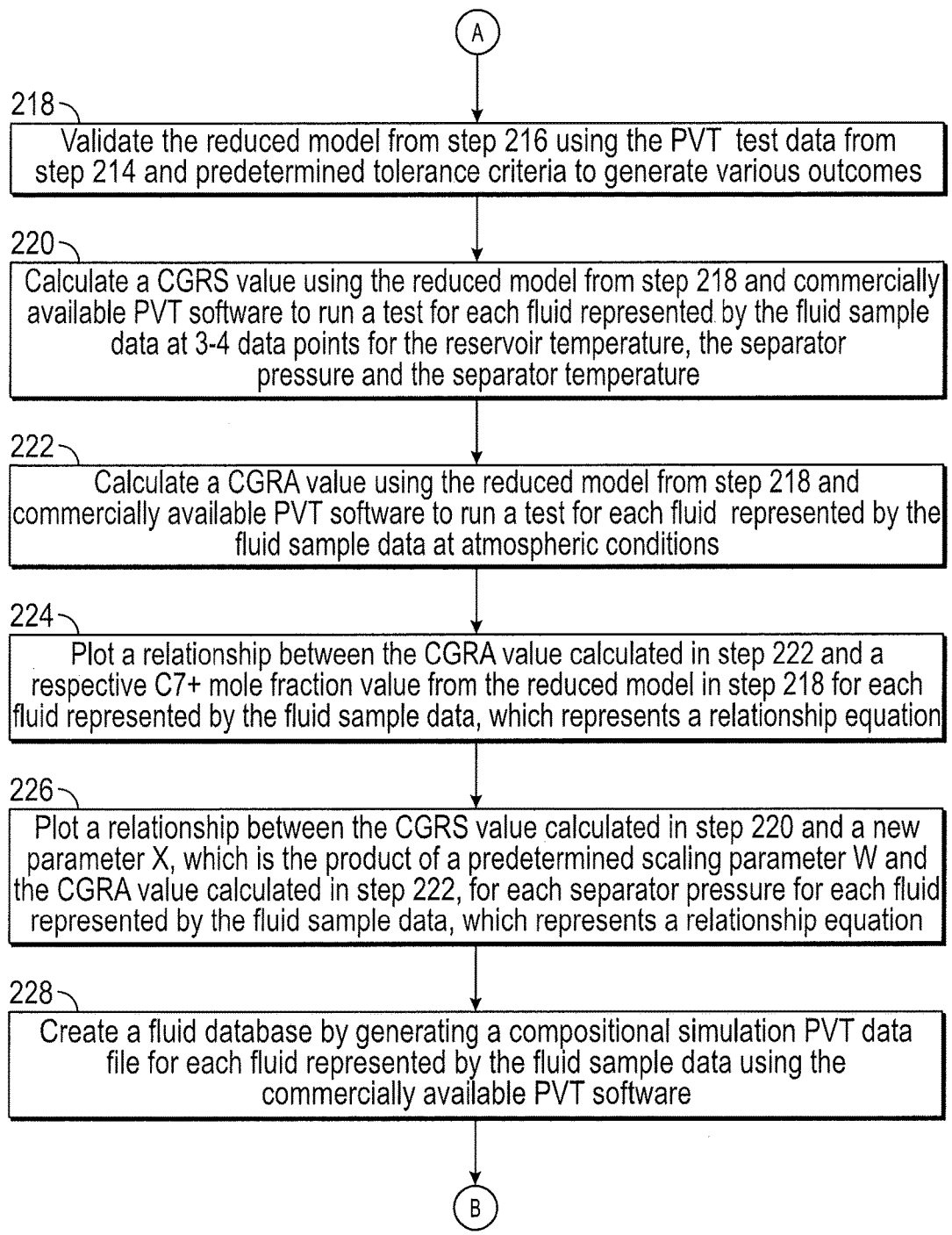
FIG. 2B is a flow diagram illustrating a continuation of the method illustrated in FIG. 2A.
Figure 2C:
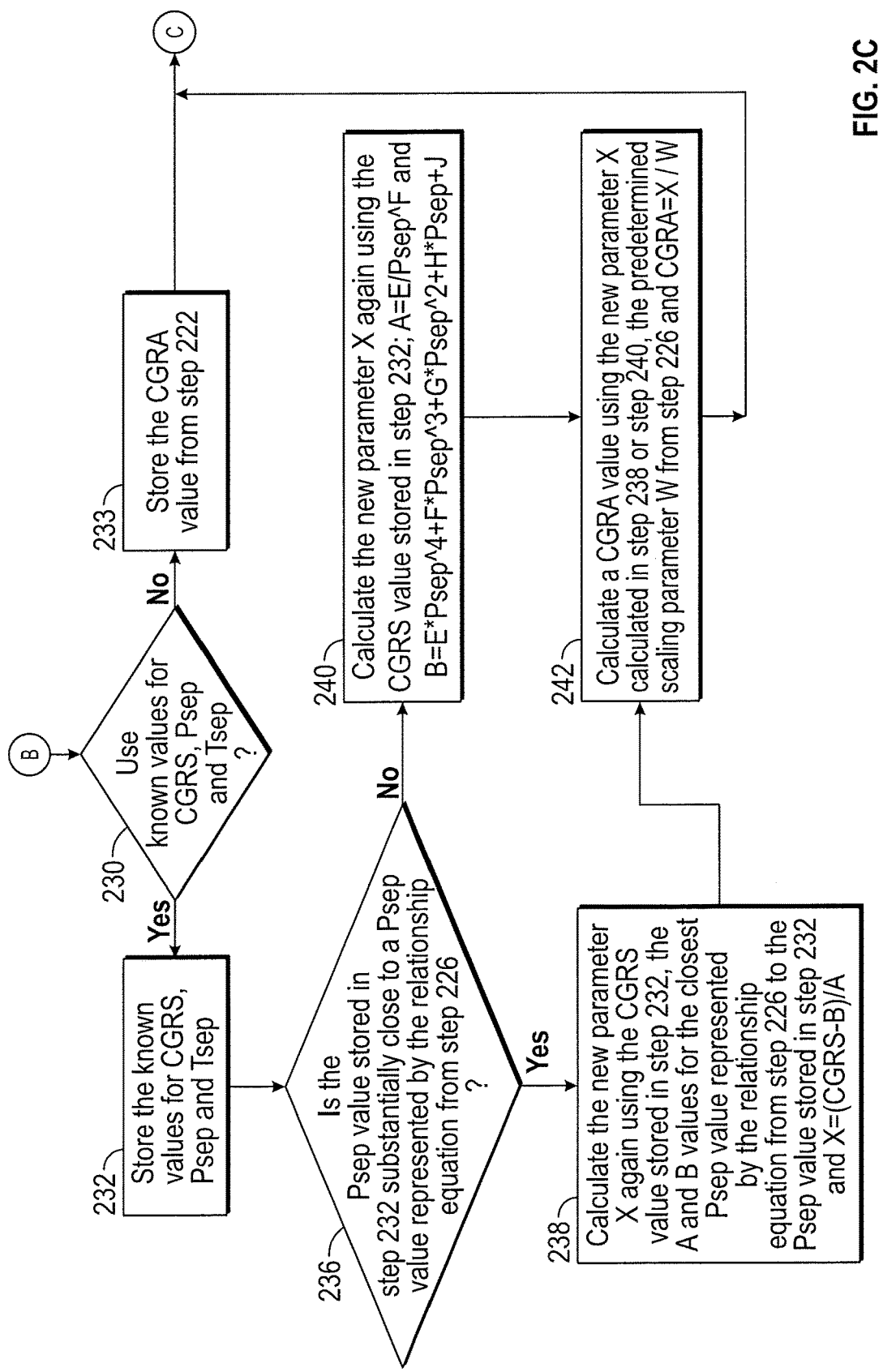
FIG. 2C is a flow diagram illustrating another embodiment of a method for implementing the present disclosure.
Figure 2D:
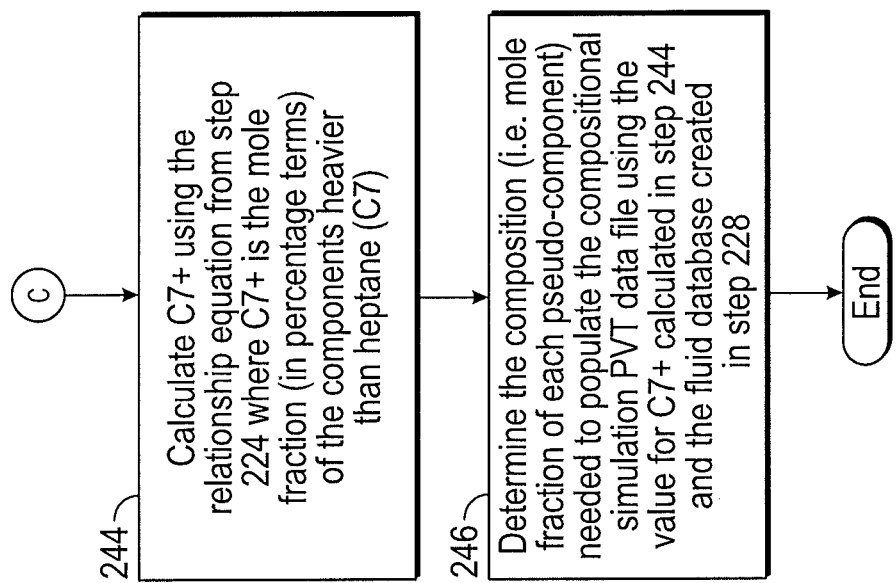
FIG. 2D is a flow diagram illustrating a continuation of the method illustrated in FIG. 2A.

In step 134, the composition (i.e. mole fraction of each pseudo-component) needed to populate the compositional simulation PVT data file is determined using the value for C7+ calculated in step 130 or step 132, the fluid database created in step 126 and the client interface and/or the video interface described in reference to FIG. 10. If there is a close enough match (e.g. within 5%) between the value for C7+ calculated in step 130 or step 132 and the C7+ value expressed as a percentage in the fluid database (e.g. table 2 below), then the mole fraction of each pseudo-component needed to populate the compositional simulation PVT data file is used for the closest C7+% and all other properties required by the numerical simulator will remain the same for all the fluids in the fluid database because a common equation of state was used for all fluids while building the fluid database. This makes the task of switching from one fluid to another very easy as it would require only to change one line of data (composition) in the PVT data file. Alternatively, if there is not a close enough match between the value for C7+ calculated in step 130 or step 132 and the C7+ value expressed as a percentage in the fluid database, then interpolation of the composition between two rows of data (mole fraction of each pseudo-component) may yield better results. Using table 2 for example, it is preferred to calculate the composition by using six out of seven components (e.g. by leaving out P3) and the following equation: P3=100−(P1+P2+P4+P5+P6+P7) to avoid round-off related errors. Whether there is not a close enough match between the value for C7+ calculated in step 130 or step 132 and the C7+ value expressed as a percentage in the fluid database will depend on the discretion and judgment of the user.

present disclosure. The method 200 may be applied to deep unconventional reservoirs where there is a significant difference between the reservoir pressure and the saturation pressure of the hydrocarbon fluid, which allows a broader scope of available pressure and temperature settings to choose from for programming the separator. In some situations, the method 200 may also be applied to unconventional shallow reservoirs because the method 200 covers a broader range of unconventional reservoirs with available pressure and temperature settings. The method 200 includes a development stage (FIGS. 2A-2B) to create a fluid database and an application stage (FIGS. 2C-2D) to select the correct data from the database. The method 200 may be applied to wet gases and gas condensates within the same GOR and CGR ranges as noted for the method 100 above.

In step 202, the method 200 determines if hydrocarbon fluid composition data is available. In deep unconventional reservoirs, hydrocarbon fluid composition data is often available for typical fluids in the gas condensate and wet gas ranges. Such data may be equally useful as actual fluid data from fluid samples collected down hole or at the separator. If hydrocarbon fluid composition data is not available, then the method proceeds to step 206. If hydrocarbon fluid composition data is available, then the method proceeds to step 204.

In step 204, fluid sample data is selected from the hydrocarbon fluid composition data that covers wet gases and gas condensates applicable to the particular unconventional shale play using the client interface and/or the video interface described in reference to FIG. 10, wherein five to seven compositions may be sufficient.

In step 206, fluid sample data is collected in the same manner as step 102 in FIG. 1 across the unconventional shale play from various wells to cover a broad range of fluid types to be produced.

In step 208, the fluid sample data from step 204 or step 206 is checked for quality in the same manner as step 104 in FIG. 1. The fluid sample data that fails to meet predetermined quality control standards may be discarded.

TABLE 2

Table for looking up the composition to use in the numerical simulator PVT data file

| C7+ % (use for lookup) | | Component | | | | | | |
|---|---|---|---|---|---|---|---|---|
| | | P1 | P2 | P3 | P4 | P5 | P6 | P7 |
| 0.694 | FLUID# 1 | 78.801 | 12.977 | 7.528 | 0.511 | 0.135 | 0.045 | 0.003 |
| 0.774 | FLUID# 2 | 75.465 | 14.637 | 9.123 | 0.613 | 0.128 | 0.032 | 0.001 |
| 0.777 | FLUID# 3 | 78.041 | 13.294 | 7.889 | 0.408 | 0.194 | 0.136 | 0.039 |
| 1.043 | FLUID# 4 | 77.538 | 12.409 | 9.010 | 0.578 | 0.258 | 0.166 | 0.041 |
| 1.119 | FLUID# 5 | 78.508 | 12.589 | 7.784 | 0.483 | 0.274 | 0.245 | 0.117 |
| 1.292 | FLUID# 6 | 76.395 | 13.025 | 9.289 | 0.585 | 0.320 | 0.271 | 0.116 |
| 1.519 | FLUID# 7 | 76.884 | 14.180 | 7.417 | 0.939 | 0.359 | 0.189 | 0.032 |
| 1.582 | FLUID# 8 | 75.041 | 13.812 | 9.566 | 0.833 | 0.394 | 0.275 | 0.080 |
| 1.941 | FLUID# 9 | 81.589 | 9.905 | 6.565 | 0.744 | 0.459 | 0.457 | 0.281 |
| 2.084 | FLUID# 10 | 74.395 | 14.431 | 9.091 | 0.793 | 0.491 | 0.493 | 0.307 |
| 2.175 | FLUID# 11 | 75.367 | 13.401 | 9.058 | 1.005 | 0.541 | 0.447 | 0.182 |
| 2.283 | FLUID# 12 | 74.919 | 13.282 | 9.515 | 1.108 | 0.570 | 0.445 | 0.160 |
| 2.387 | FLUID# 13 | 80.477 | 9.881 | 7.255 | 0.837 | 0.543 | 0.582 | 0.425 |
| 2.452 | FLUID# 14 | 76.265 | 13.690 | 7.593 | 0.860 | 0.558 | 0.598 | 0.436 |
| 2.691 | FLUID# 15 | 77.239 | 11.728 | 8.341 | 1.143 | 0.658 | 0.596 | 0.294 |
| 3.388 | FLUID# 16 | 73.651 | 13.338 | 9.623 | 1.427 | 0.826 | 0.755 | 0.380 |
| 3.647 | FLUID# 17 | 86.516 | 6.567 | 3.270 | 1.332 | 0.846 | 0.877 | 0.592 |
| 4.732 | FLUID# 18 | 71.386 | 13.930 | 9.953 | 1.904 | 1.138 | 1.086 | 0.604 |
| 9.076 | FLUID# 19 | 65.953 | 14.997 | 9.974 | 6.715 | 1.747 | 0.572 | 0.042 |
| 9.922 | FLUID# 20 | 59.414 | 15.807 | 14.856 | 3.203 | 2.169 | 2.464 | 2.086 |

Referring now to FIGS. 2A-2D, a flow diagram illustrates another embodiment of a method 200 for implementing the In step 210, an equation-of-state (EOS) model (e.g. the Peng-Robinson or Soave-Redlich-Kwong EOS model) is selected for the fluids represented by the remaining fluid sample data from step 208 using commercially available PVT software.

In step 212, a full model is created using the EOS model selected in step 210 and the commercially available PVT software. This step may involve some initial lumping of heavier components, which usually have smaller mole fractions for wet gases and gas condensates, while honoring available lab data.

In step 214, PVT test data are generated using the full model created in step 212 and commercially available PVT software. The PVT test data may include P-T diagram data, separator test data, CCE data and CVD data.

Figure 6:
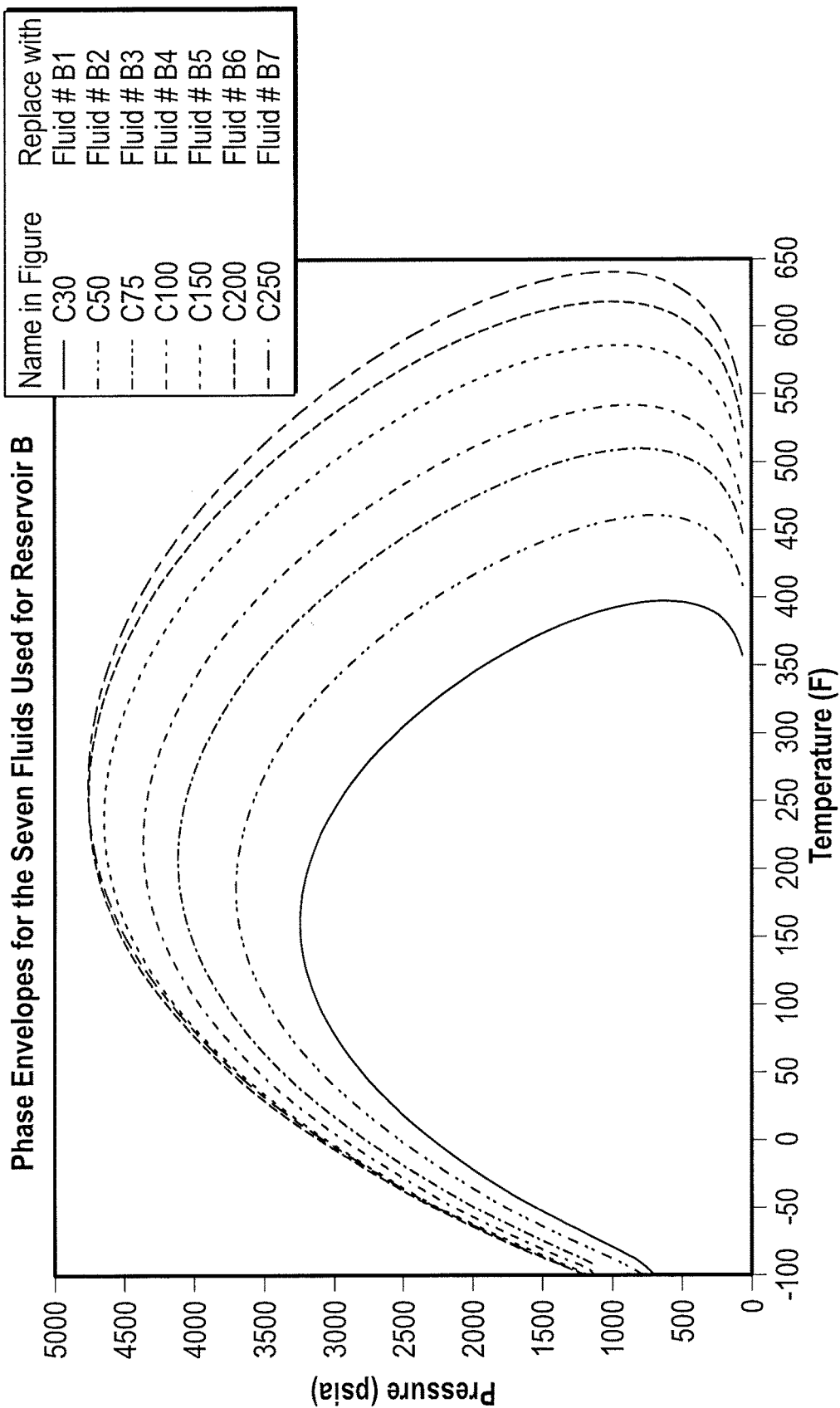
FIG. 6 is a P-T diagram illustrating the wet gases and gas condensates used in the examples for FIGS. 7-9.

In step 216, a reduced pseudo-component model is created from the full model generated in step 212 using trial and error techniques and commercially available PVT software. This step is necessary to create a reduced model, which can be used in compositional simulation. The reduced model is a common pseudo-component model in which further lumping is done to reduce the total number of pseudo-components to less than about 10, which reduces the compositional simulation time. Phase behavior calculations and compositional simulations with an equation of state require the use of pseudo-components to represent the oil and gas mixtures. Because of the large number of components which form the heavy fractions (e.g. C7+ fractions), it is necessary to group them into pseudo-components. In other words, the more pseudo-components there are, the longer the simulation will take. Furthermore, to minimize simulation time, it is also advantageous to lump the light fractions. FIG. 6 illustrates the phase envelopes in a P-T diagram of the wet gases and gas condensates used in the following examples for the method 200.

In step 218, the reduced model from step 216 is validated using the PVT test data from step 214, predetermined tolerance criteria to generate various outcomes and commercially available PVT software. If the results of the various outcomes substantially match (i.e. fall within an acceptable margin of error), then the reduced model is validated. Otherwise, step 216 may be repeated to create another reduced model for validation.

In step 220, a CGR value, which is hereinafter referred to as the CGRS value, is calculated using the reduced model from step 218 and commercially available PVT software to run a test for each fluid represented by the fluid sample data at 3-4 data points for the reservoir temperature, the separator pressure and the separator temperature. In this manner, multiple tests are run for each set of data points compared to step 116 in which only one test is required at the actual reservoir temperature, separator pressure and separator temperature. For example, if 3 reservoir pressures, 4 separator temperatures and 4 separator pressures are used, then the total number of tests to calculate CGRS for each fluid will be 3×4×4=48. Because 3-4 data points are used, this step covers a broad range of reservoir depths, reservoir temperatures, which generally increase linearly with depth, and several possible separator conditions (Psep and Tsep).

In step 222, a CGR value, which is hereinafter referred to as the CGRA value, is calculated using the reduced model from step 218 and commercially available PVT software to run a test for each fluid represented by the fluid sample data at atmospheric conditions.

Figure 7A:
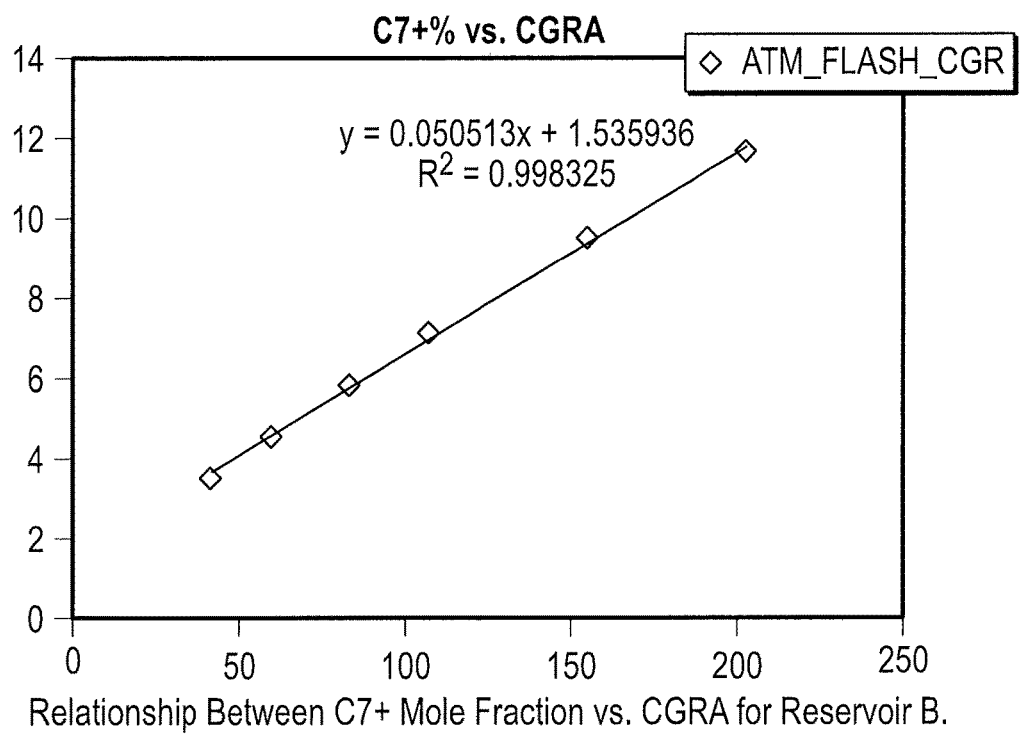
FIG. 7A is a graph illustrating the relationship between a CGRA value and a respective C7+ mole fraction value from a reduced model for another exemplary reservoir.

In step 224, a relationship is plotted between the CGRA value calculated in step 222 and a respective C7+ mole fraction value from the reduced model in step 218 for each fluid represented by the fluid sample data by plotting the values using any technique well known in the art, such as the least squares method, and the client interface and/or the video interface described in reference to FIG. 10. The relationship is represented by an equation, which is preferably linear or quadratic, and may be validated by accepting a high coefficient of correlation ($R^2$) and, if necessary, eliminating obvious outliers from the relationship. FIG. 7A illustrates the relationship between a CGRA value and a respective C7+ mole fraction value from a reduced model for an exemplary reservoir except that outliers were not removed.

Figure 7B:
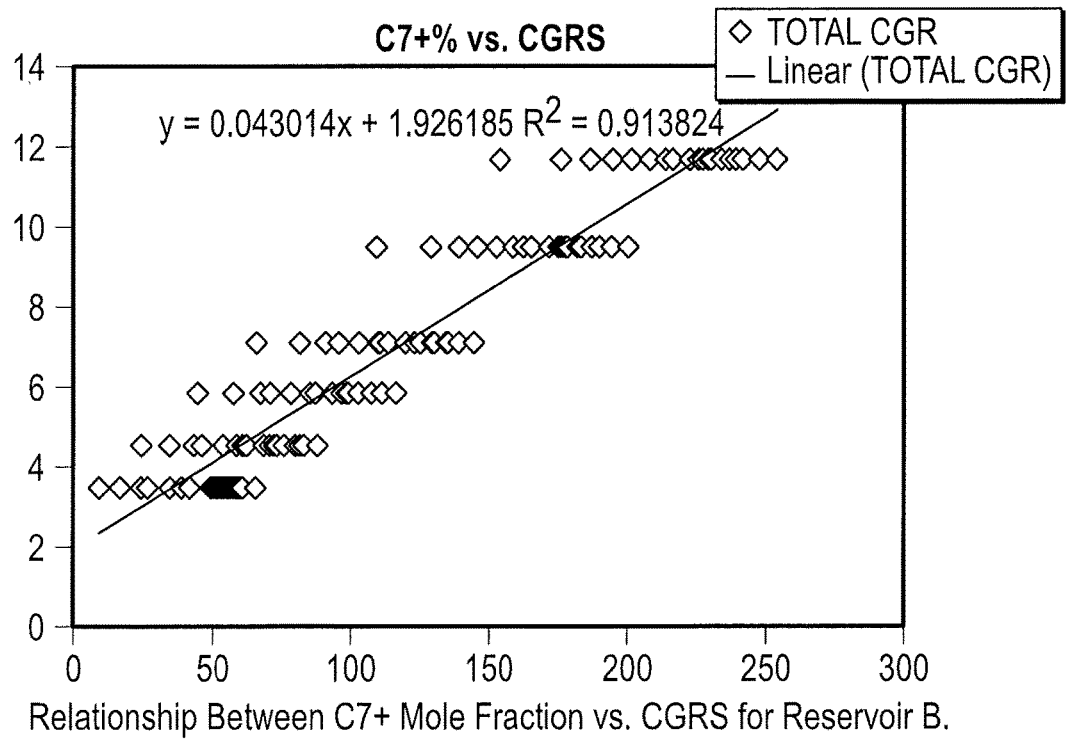
FIG. 7B is a graph illustrating the relationship and lack of correlation between a CGRS value calculated in step 220 of FIG. 2A and a respective C7+ mole fraction value from a reduced model for the same reservoir used in FIG. 7A.
Figure 8:
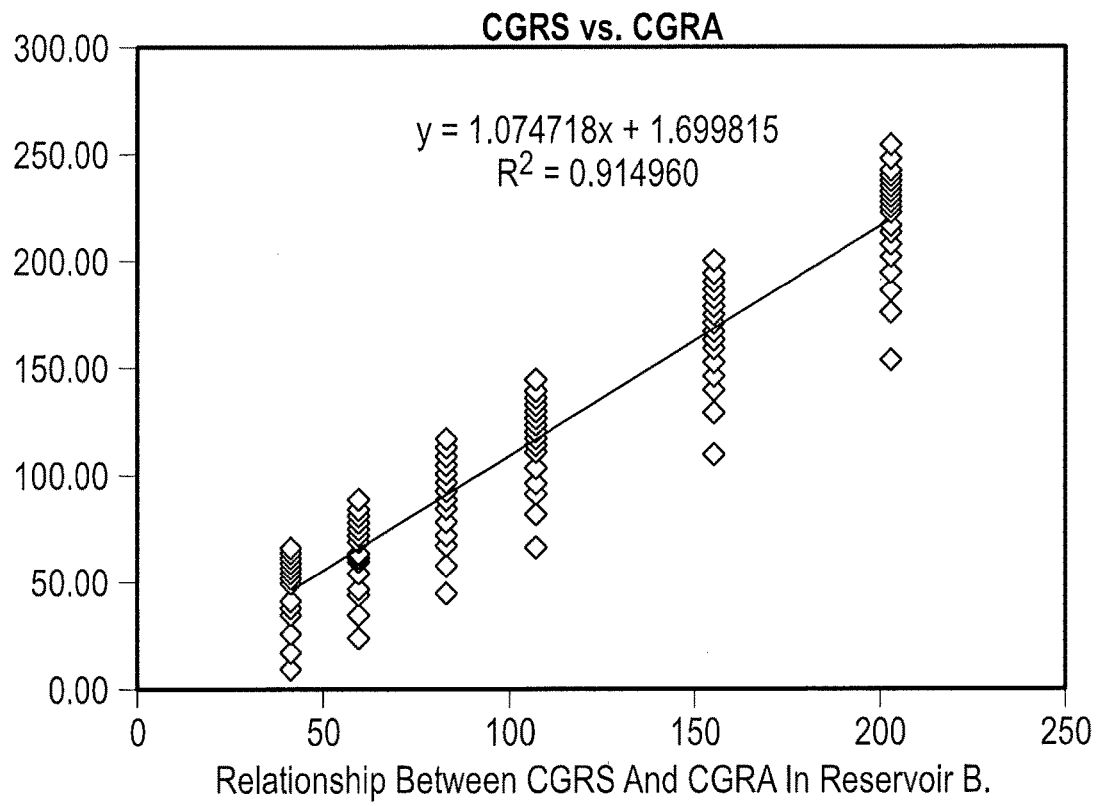
FIG. 8 is a graph illustrating the relationship and lack of correlation between the CGRS value calculated in step 220 of FIG. 2A and the CGRA value calculated in step 222 of FIG. 2A.
Figure 9:
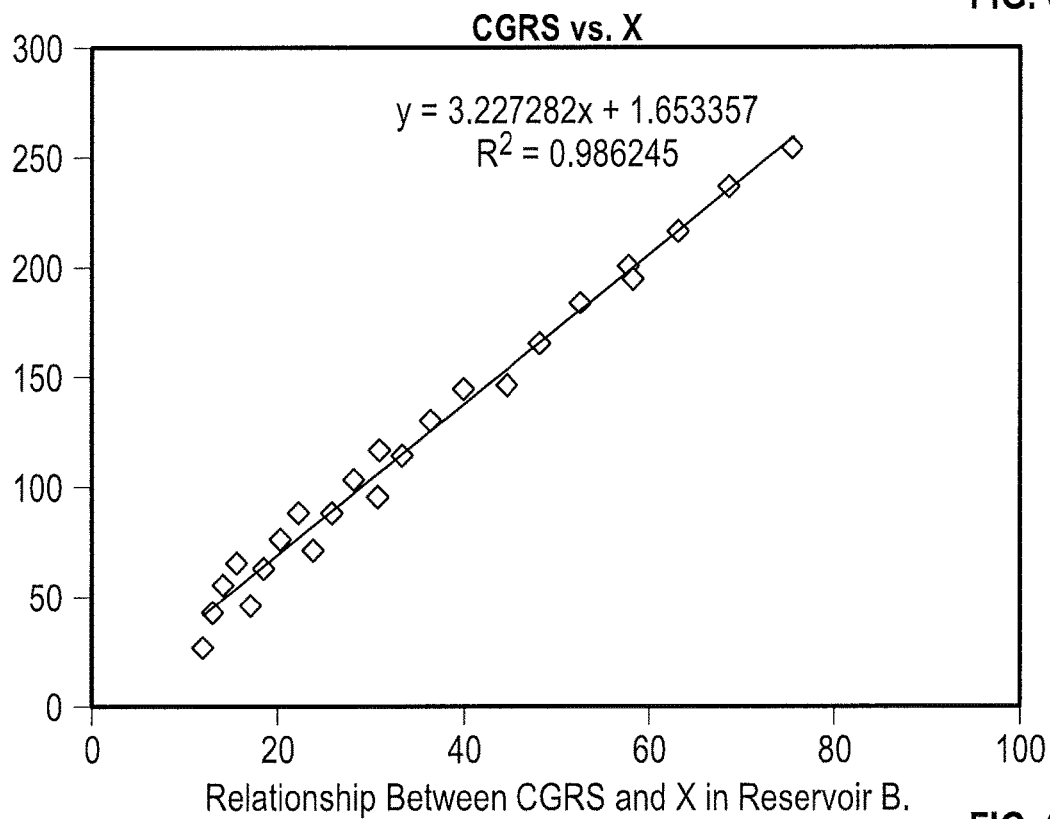
FIG. 9 is a graph illustrating the relationship and better correlation between the CGRS value calculated in step 220 of FIG. 2A and a new parameter X.

In step 226, a relationship is plotted between the CGRS value calculated in step 220 and a new parameter X, which is the product of a predetermined scaling parameter W and the CGRA value calculated in step 222, for each separator pressure for each fluid represented by the fluid sample data by plotting the values using any technique well known in the art, such as the least squares method, and the client interface and/or the video interface described in reference to FIG. 10. The predetermined scaling parameter W is calculated using the Psep and Tsep values stored in step 232 and $W=P_{sep}/(T_{sep}+460)$. The relationship is represented by an equation, which is preferably linear or quadratic, and may be validated by accepting a high coefficient of correlation ($R^2$) and, if necessary, eliminating obvious outliers from the relationship. FIG. 7B illustrates the relationship and lack of correlation between a CGRS value calculated in step 220 and a respective C7+ mole fraction value from a reduced model for the same reservoir used in FIG. 7A. FIG. 8 illustrates the relationship and lack of correlation between the CGRS value calculated in step 220 and the CGRA value calculated in step 222. FIG. 9, however, illustrates the relationship and better correlation between a CGRS value calculated in step 220 and the new parameter X.

In step 228, a fluid database is created by generating a compositional simulation PVT data file for each fluid represented by the fluid sample data using the commercially available PVT software that may also be used to run standard tests (e.g. separator test and CME, CVD tests) for producing additional data for the fluid database. Based on the number of fluid test reports received, the fluid database is maintained for each field, which contains but is not limited to PVT data tables in specific numerical simulator input format, the mole fractions of the pseudo-components, saturation pressure (dew point pressure), data on any separator test, and CME, CVD tests, for example. Preferably, a minimum of 5 fluid reports per field is recommended. An exemplary fluid database is illustrated in table 4 below, which includes the mole fraction of seven different pseudo-components (P1-P7), expressed as a percentage, and a C7+% value for each respective fluid.

In step 230, the method 200 determines whether to use known values for CGRS, Psep and Tsep based on the use of a separator. If the CGRS value and respective Psep and Tsep values are not known, then the method 200 proceeds to step 233. If the CGRS value and respective Psep and Tsep values are known, then the method 200 proceeds to step 232.

In step 232, the known values for CGRS, Psep and Tsep are stored.

In step 233, the CGRA value from step 222 is stored.

In step 236, the method 200 determines if the Psep value stored in step 232 is substantially close to a Psep value represented by the relationship equation from step 226 using the client interface and/or the video interface described in reference to FIG. 10. The relationship equation from step 226 for the relationship illustrated in FIG. 9 is used to create table 3 below for various Psep values, wherein A and B are coefficients in the relationship equation from step 226. Whether the Psep value stored in step 232 is substantially close to a Psep value in table 3 below will depend on the discretion and judgment of the user. If the Psep value stored in step 232 is not substantially close to a Psep value in table 3 below, then the method 200 proceeds to step 240. If the Psep value stored in step 232 is substantially close to a Psep value in table 3 below, then the method 200 proceeds to step 238. It should be noted that for other deep reservoirs, the values in table 3 may change.

TABLE 3

A and B for different Psep values

| Psep (psia) | A | B |
|---|---|---|
| 50 | 11.9313 | −12.2549 |
| 100 | 6.2400 | −4.9440 |
| 200 | 3.1920 | 2.7565 |
| 500 | 1.2568 | 9.7403 |
| 750 | 0.8210 | 10.4457 |
| 1000 | 0.6057 | 9.7749 |

In step 238, the new parameter X is calculated again using the CGRS value stored in step 232, the A and B values for the closest Psep value represented by the relationship equation from step 226 to the Psep value stored in step 232 and $X=(CGRS-B)/A$.

In step 240, the new parameter X is calculated again using the CGRS value stored in step 232; $A=E/Psep^F$ and $B=E*Psep^4+F*Psep^3+G*Psep^2+H*Psep+J$ (wherein Psep is from step 232 and E, F, G, H, J are coefficients); and $X=(CGRS-B)/A$. The equations for A and B were derived from the curve-fitting data in table 3. The values for E, F, G, H, and J may vary depending on the PVT data for a particular field, however, are $E=-1.827\times10^4$, $F=4.7433\times10^{-7}$, $G=-4.5178\times10^{-4}$, $H=0.1903$ and $J=-20.429$ for the particular shale play used in FIG. 9.

In step 242, a CGRA value is calculated using the new parameter X calculated in step 238 or step 240, the predetermined scaling parameter W from step 226 and $CGRA=X/W$.

In step 244, C7+ is calculated using the relationship equation from step 224 where C7+ is the mole fraction (in percentage terms) of the components heavier than heptane (C7). For the particular shale play used in FIG. 9, the equation is $C7+\%=0.048772\times CGRA+1.686764$, wherein CGRA is the CGRA value from step 233 or step 242 for each fluid. For other shallow deep reservoirs like the one used for the exemplary equation above, the relationship equation will have the same form except that the coefficients may be slightly different.

In step 246, the composition (i.e. mole fraction of each pseudo-component) needed to populate the compositional simulation PVT data file is determined using the value for C7+ calculated in step 244, the fluid database created in step 228 and the client interface and/or the video interface described in reference to FIG. 10. If there is a close enough match (e.g. within 5%) between the value for C7+ calculated in step 244 and the C7+ value expressed as a percentage in the fluid database (e.g. table 4 below), then the mole fraction of each pseudo-component needed to populate the compositional simulation PVT data file is used for the closest C7+% and all other properties required by the numerical simulator will remain the same for all the fluids in the fluid database because a common equation of state was used for all fluids while building the fluid database. This makes the task of switching from one fluid to another very easy as it would require only to change one line of data (composition) in the PVT data file. Alternatively, if there is not a close enough match between the value for C7+ calculated in step 244 and the C7+ value expressed as a percentage in the fluid database, then interpolation of the composition between two rows of data (mole fraction of each pseudo-component) may yield better results. Using table 4 for example, it is preferred to calculate the composition by using six out of seven components (e.g. by leaving out P3) and the following equation: $P3=100-(P1+P2+P4+P5+P6+P7)$ to avoid round-off related errors. Whether there is not a close enough match between the value for C7+ calculated in step 244 and the C7+ value expressed as a percentage in the fluid database will depend on the discretion and judgment of the user.

TABLE 4

Table for looking up the composition to use in the numerical simulator PVT data file

| C7+ % (use for lookup) | | Component | | | | | | |
|---|---|---|---|---|---|---|---|---|
| | | P1 | P2 | P3 | P4 | P5 | P6 | P7 |
| 3.471 | FLUID# B1 | 72.6170 | 12.1510 | 11.7610 | 2.7460 | 0.6170 | 0.1020 | 0.0060 |
| 4.518 | FLUID# B2 | 71.8220 | 12.0200 | 11.6400 | 3.2000 | 1.0250 | 0.2630 | 0.0300 |
| 5.807 | FLUID# B3 | 70.8450 | 11.8590 | 11.4890 | 3.7400 | 1.4800 | 0.5000 | 0.0870 |
| 7.076 | FLUID# B4 | 69.8940 | 11.7000 | 11.3300 | 4.2890 | 1.8940 | 0.7330 | 0.1600 |
| 9.478 | FLUID# B5 | 68.0850 | 11.3980 | 11.0390 | 5.2880 | 2.6430 | 1.2030 | 0.3440 |
| 11.635 | FLUID# B6 | 66.4670 | 11.1235 | 10.7745 | 6.1190 | 3.2875 | 1.6565 | 0.5720 |
| 13.792 | FLUID# B7 | 64.8490 | 10.8490 | 10.5100 | 6.9500 | 3.9320 | 2.1100 | 0.8000 |

Each method 100 and method 200 involves the use of a common equation of state for all of the fluids and therefore, all data pertaining to the equation of state such as binary interaction coefficients, critical pressure, critical temperature, acentric factor, volume shift parameters will be common for all of the fluids—only the mole fractions will be different for different fluids or samples taken from different parts of the shale play. Because black oil models based on correlations do not work very well for gas condensates and wet gases in unconventional shale plays, and produce erroneous results as far as prediction of gas and oil production for a gas condensate or a wet gas reservoir, the use of either method can produce more accurate correlation results. Moreover, the use of either method only requires the input of three easily accessible parameters (CGRS, Psep. and Tsep.) to generate all of the PVT data required for numerical simulation of the wet gases and gas condensates. In particular, for history matching, either method makes it easy to account for changes in CGR values without having to go through elaborate procedures.

Even if the compositional model generated by either method is not used directly, a black oil model can be generated from it following well known methods. The present disclosure therefore, provides a way to create both compositional and black oil fluid models, given only a limited input, whereas previously established, well known, correlations only provide a way to generate black oil models that often yield inconsistent results for gas condensate or a wet gas reservoirs. These inconsistencies arise because the practitioner often has to mix and match correlations that were developed at different times by different researchers for fluids from different sets of oilfields.

The fluid models generated by either method can be used for reservoir simulation studies as well as for compositional grading studies or for estimating parameters of laboratory settings involving reservoir fluids. When implemented as part of reservoir simulation software, each method provides a quick and easy way to generate fluid models for use in simulation, without requiring expensive, time-consuming fluid analysis, and creating templates for any field. Each method also allows switching from one composition to another quickly, which permits additional flexibility during the history matching phase of compositional simulation. Because each method is based on an equation of state, each method is very robust, fast, efficient and cost-effective.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. Nexus®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 10, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1A-1B and 2A-2D. The memory therefore, includes any commercially available PVT software application, which enables steps 104-118, 126, 210-222 and 228 described in reference to FIGS. 1A-1B and FIGS. 2A-2D. The memory also includes an equation of state correlation module, which may integrate functionality from the remaining application programs illustrated in FIG. 10 to perform the remaining steps described in reference to FIGS. 1A-1B and FIGS. 2A-2D. Nexus® may be used as an interface application to run a simulation using the results of the methods described in reference to FIGS. 1A-1B and FIGS. 2A-2D. Although Nexus® may be used as interface application, other interface applications may be used, instead, or the equation of state correlation module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for correlating gas condensates and wet gases in unconventional shale plays, which comprises:
    collecting hydrocarbon fluid samples across an unconventional shale play from more than one well;
    calculating a condensate gas-ratio value using a reduced pseudo-component fluid model and data for each fluid sample at a reservoir temperature, a separator pressure and a separator temperature;
    calculating another condensate gas-ratio value using the reduced pseudo-component fluid model and data for each fluid sample at atmospheric conditions;
    plotting a relationship between the another condensate gas-ratio value and a respective C7+ mole fraction value from the reduced pseudo-component fluid model for each fluid sample using a computer processor, the relationship representing another condensate gas-ratio relationship equation;
    plotting a relationship between the condensate gas-ratio value and a respective C7+ mole fraction value from the reduced pseudo-component fluid model for each fluid sample using the computer processor, the relationship representing a condensate gas-ratio relationship equation;
    creating a fluid database using a compositional simulation PVT data file for each fluid sample;
    calculating a C7+ value using one of the another condensate gas-ratio value for each fluid sample and the another condensate gas-ratio relationship equation and the condensate gas-ratio value for each fluid sample and the condensate gas-ratio relationship equation, wherein C7+ represents the mole fraction of components heavier than heptane (C7);
    determining a mole fraction of each pseudo-component in the reduced pseudo-component fluid model using the C7+ value and the fluid database; and,
    separating the hydrocarbon fluid from said unconventional shale plays into liquid and gas fractions utilizing a separator, wherein the separator is programmed to separate the hydrocarbon fluid according to the mole fraction of each pseudo-component determined in the determining step.

2. The method of claim 1, wherein the reduced pseudo-component fluid model is based on a full fluid model, which is created using an equation-of-state model selected for each fluid.

3. The method of claim 1, wherein the fluid database comprises a mole fraction for each fluid and a C7+ value for each fluid.

4. The method of claim 2, further comprising validating the reduced pseudo-component fluid model using PVT test data from the full fluid model and a predetermined tolerance criteria.

5. A method for correlating gas condensates and wet gases in unconventional shale plays, which comprises:
    collecting hydrocarbon fluid samples across an unconventional shale play from more than one well;
    calculating a condensate gas-ratio value using a reduced pseudo-component fluid model and data for each fluid at multiple data points for a reservoir temperature, a separator temperature and a separator pressure;
    calculating an another condensate gas-ratio value using the reduced pseudo-component fluid model and data for each fluid sample at atmospheric conditions;
    plotting a relationship between the another condensate gas-ratio value and a respective C7+ mole fraction value from the reduced pseudo-component fluid model for each fluid sample using a computer processor, the relationship representing another condensate gas-ratio relationship equation;
    plotting a relationship between the condensate gas-ratio value and a new parameter X, which is a product of a predetermined scaling parameter W and the condensate gas-ratio value for each separator pressure for each fluid sample using the computer processor, the relationship representing a condensate gas-ratio relationship equation;
    creating a fluid database using a compositional simulation PVT data file for each fluid sample;
    calculating a C7+ value using the another condensate gas-ratio relationship equation and one of a known another condensate gas-ratio value for each fluid sample and a calculated another condensate gas-ratio value for each fluid sample, wherein C7+ represents the mole fraction of components heavier than heptane (C7);
    determining a mole fraction of each pseudo-component in the reduced pseudo-component fluid model using the C7+ value and the fluid database; and,
    separating the hydrocarbon fluid from said unconventional shale plays into liquid and gas fractions utilizing a separator, wherein the separator is programmed to separate the hydrocarbon fluid according to the mole fraction of each pseudo-component determined in the determining step.

6. The method of claim 5, wherein the another condensate gas-ratio value is calculated for each fluid sample using another new parameter X, the predetermined scaling parameter W and the another condensate gas ratio=X/W.

7. The method of claim 6, wherein the predetermined scaling parameter W is calculated using a known separator pressure (Psep), a known separator temperature (Tsep), and W=Psep/(Tsep+460).

8. The method of claim 6, wherein the another new parameter X is calculated using a known condensate gas-ratio value, coefficient values for coefficients A and B in the condensate gas-ratio relationship equation, the known separator pressure and X=(condensate gas-ratio-B)/A.

9. The method of claim 5, wherein the reduced pseudo-component fluid model is based on a full fluid model, which is created using an equation-of-state model selected for each fluid.

* * * * *